(12) United States Patent
Mitsuda

(10) Patent No.: US 8,683,788 B2
(45) Date of Patent: Apr. 1, 2014

(54) EXHAUST GAS PURIFYING DEVICE

(75) Inventor: Masataka Mitsuda, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 459 days.

(21) Appl. No.: 12/737,932

(22) PCT Filed: Sep. 7, 2009

(86) PCT No.: PCT/JP2009/065599
§ 371 (c)(1),
(2), (4) Date: Mar. 25, 2011

(87) PCT Pub. No.: WO2010/032645
PCT Pub. Date: Mar. 25, 2010

(65) Prior Publication Data
US 2011/0167807 A1      Jul. 14, 2011

(30) Foreign Application Priority Data

Sep. 18, 2008   (JP) .................. 2008-239402

(51) Int. Cl.
*F01N 3/02* (2006.01)
(52) U.S. Cl.
USPC ............................................. 60/311
(58) Field of Classification Search
USPC ........................................... 60/286, 311
See application file for complete search history.

(56) References Cited

U.S. PATENT DOCUMENTS

| | | | |
|---|---|---|---|
| 3,934,411 A | 1/1976 | Masaki et al. | |
| 4,673,423 A * | 6/1987 | Yumlu | ............................. 55/319 |
| 5,209,062 A | 5/1993 | Vollenweider | |
| 6,983,728 B1 * | 1/2006 | Banks et al. | ............... 123/198 R |
| 2003/0159436 A1 * | 8/2003 | Foster et al. | ..................... 60/297 |
| 2010/0086446 A1 | 4/2010 | Matsunaga et al. | |

FOREIGN PATENT DOCUMENTS

| | | |
|---|---|---|
| CN | 1058451 | 2/1992 |
| EP | 1 321 640 | 6/2003 |
| JP | 2000-145430 | 5/2000 |
| JP | 2001-173429 | 6/2001 |
| JP | 2003-027922 | 1/2003 |
| JP | 2003-120277 | 4/2003 |
| JP | 2004340114 A * | 12/2004 |
| JP | 2005-016374 | 12/2005 |
| JP | 2007-146681 | 6/2007 |
| JP | 2008-031955 | 2/2008 |
| JP | 2008-082201 | 4/2008 |

OTHER PUBLICATIONS

English translation of JP 2004-340114 A.*

* cited by examiner

*Primary Examiner* — Thomas Denion
*Assistant Examiner* — Jason Shanske
(74) *Attorney, Agent, or Firm* — Jordan and Hamburg LLP

(57) ABSTRACT

A general purpose property of an exhaust gas purifying device for mounting is improved by increasing the attaching pattern of an exhaust gas purifying device, in the case that the exhaust gas purifying device is attached to a diesel engine. An exhaust gas purifying device is provided with gas purifying filters purifying an exhaust gas discharged from a diesel engine, inner cases internally provided with the gas purifying filters, and outer cases internally provided with the inner cases. An exhaust gas inlet pipe having an exhaust gas inlet side is provided in the midstream portion in a longitudinal direction of the outer case. An exhaust gas inflow port is provided in one end side in a longitudinal direction of the catalyst outer case. An exhaust gas outlet side of the exhaust gas inlet pipe is structured such as to be connected to the exhaust gas inflow port of the catalyst outer case.

4 Claims, 23 Drawing Sheets

EXHAUST GAS PURIFYING DEVICE

TECHNICAL FIELD

The present invention relates to an exhaust gas purifying device mounted on a diesel engine or the like, and more particularly to an exhaust gas purifying device removing a particulate matter (soot and particulate) included in an exhaust gas, or a nitrogen oxide (NOx).

BACKGROUND OF THE INVENTION

Conventionally, there has been known a technique structured such that a diesel particulate filter (or an NOx catalyst) or the like is provided as an exhaust gas purifying device (an after treatment device) in an exhaust gas discharge route of the diesel engine, and the exhaust gas discharged out of the diesel engine is purified by the diesel particulate filter (or the NOx catalyst) or the like (refer to Patent Document 1, Patent Document 2, and Patent Document 3). Further, there has been known a technique in which a filter case (an inner case) is provided within a casing (an outer case), and a particulate filter is arranged within the filter case (see Patent Document 4).

CITATION LIST

Patent Document 1: Japanese Patent Application Laid-open No. 2000-145430
Patent Document 2: Japanese Patent Application Laid-open No. 2003-27922
Patent Document 3: Japanese Patent Application Laid-open No. 2008-82201
Patent Document 4: Japanese Patent Application Laid-open No. 2001-173429

SUMMARY OF THE INVENTION

In the meantime, the diesel engine has a wide general purpose property, and is used in various fields such as a farm working machinery, a construction machinery, and a marine vessel. A mounting space of the diesel engine is variously changed in accordance with the machine to be mounted, however, in recent years, at the request of a weight saving and a compact construction, it is often the case that the mounting space is restricted (narrow). Further, in the exhaust gas purifying device mentioned above, it is assumed to be desirable that a temperature of the exhaust gas passing therethrough is a high temperature (for example, 300° C. or higher). Therefore, there is such a request that the exhaust gas purifying device should be attached to the diesel engine.

However, in the case that the exhaust gas purifying device is attached to the diesel engine, there are generated such problems that an engine vibration caused by driving tends to be directly transmitted to the exhaust gas purifying device, and that if a cooling wind from a cooling fan provided in the diesel engine directly blows against the exhaust gas purifying device, there is a risk of descending the temperature of the exhaust gas purifying device, further of the exhaust gas.

Further, in order to improve the general purpose property of the mounting in one kind of diesel engine, it is desirable that a direction of the exhaust gas route and a structure of an auxiliary equipment can be freely changed. In other words, it is desirable that an attaching direction of the exhaust gas purifying device can be changed. However, since in the diesel engine, a cylinder head, a cylinder block, a crank case, an intake manifold, an exhaust gas manifold and the like which form an outer shape are manufactured by a casting mold, a design change of the casting mold is necessary at a time of changing the attaching direction of the exhaust gas purifying device, in the conventional structure mentioned above. The design change has such a problem that the manufacturing cost is high.

Further, if the design of the exhaust gas manifold is changed, there is a possibility that a tendency of an exhaust gas emission (a particulate matter, an NOx or the like) in the exhaust gas is changed. Therefore, it is necessary to test or check per the design changed exhaust gas manifold. Accordingly, a working man hour caused by the test and check is increased, and the manufacturing cost is also increased in this regard.

Accordingly, an object of the present invention is to provide an exhaust gas purifying device which dissolves the problems mentioned above.

SUMMARY OF THE INVENTION

In order to achieve the object mentioned above, in accordance with a first aspect of the present invention, there is provided an exhaust gas purifying device including a gas purifying filter for purifying an exhaust gas exhausted from an engine, an inner case having the gas purifying filter build-in, and an outer case having the inner case build-in, wherein an exhaust gas inlet pipe having an exhaust gas inlet is provided, an exhaust gas inflow port is provided in one end side in a longitudinal direction of the outer case, the exhaust gas inlet pipe is arranged in a midstream portion in the longitudinal direction of the outer case, and an exhaust gas outlet of the exhaust gas inlet pipe is connected to the exhaust gas inflow port.

In accordance with a second aspect of the present invention, there is provided an exhaust gas purifying device as recited in the first aspect, wherein the exhaust gas inlet side of the exhaust gas inlet pipe is connected to an exhaust gas manifold of the engine in such a manner that an attaching direction is changeable.

In accordance with a third aspect of the present invention, there is provided an exhaust gas purifying device as recited in the first aspect, wherein the exhaust gas inlet pipe is attached to the outer case in such a manner as to cover the exhaust gas inflow port and extend in the longitudinal direction of the outer case.

In accordance with a fourth aspect of the present invention, there is provided an exhaust gas purifying device as recited in the second aspect, wherein a conduction passage of the exhaust gas is constructed by an outer surface of the outer case and an inner surface of the exhaust gas inlet pipe.

In accordance with a fifth aspect of the present invention, there is provided an exhaust gas purifying device as recited in the first aspect, wherein the exhaust gas inlet side of the exhaust gas inlet pipe is positioned in a center portion in the longitudinal direction of the outer case, and the outer case is positioned between a cooling fan in one side of the engine and a flywheel housing in the other side.

In accordance with a sixth aspect of the present invention, there is provided an exhaust gas purifying device as recited in the first aspect, wherein a plurality of filter support bodies are attached to a cylinder head of the engine, and one end side in the longitudinal direction and the other end side in the longitudinal direction in the outer case are detachably connected to the cylinder head via each of the filter support bodies.

In accordance with the first aspect of the present invention, in the exhaust gas purifying device having the gas purifying filter for purifying the exhaust gas exhausted from the engine, the inner case having the gas purifying filter build-in, and the outer case having the inner case build-in, since the exhaust gas inlet pipe having an exhaust gas inlet is provided, and the exhaust gas inflow port is provided in the one end side in the longitudinal direction of the outer case, it is possible to form the gas purifying filter long and to set a distribution distance of the exhaust gas within the outer case long, by effectively utilizing the length in the longitudinal direction of the outer case, so that it is possible to achieve an improvement of an exhaust gas purifying performance in the exhaust gas purifying device. In addition, since the exhaust gas inlet pipe is arranged in the midstream portion in the longitudinal direction of the outer case, and the exhaust gas outlet of the exhaust gas inlet pipe is connected to the exhaust gas inflow port, there can be obtained such an effect that it is possible to stably support the exhaust gas purifying device, by the exhaust gas inlet pipe in the midstream portion in the longitudinal direction of the outer case, while intending to improve the exhaust gas purifying performance.

In accordance with the second aspect of the present invention, since the exhaust gas inlet side of the exhaust gas inlet pipe is connected to the exhaust gas manifold of the engine in such a manner that the attaching direction is changeable, it is possible to select and change the direction of the exhaust gas outflow port from the outer case. In other words, it is possible to cope with a plurality of specifications having different directions of the exhaust gas outflow ports by one kind of exhaust gas purifying device. Therefore, since the structure of the exhaust gas purifying device itself is not changed, there is no risk that the tendency of the exhaust gas emission (the particulate matter, the NOx, and the like) in the exhaust gas passing through the exhaust gas purifying device changes, and there can be achieved such effects that it is possible to omit a labor hour or the like for testing and checking or shipping per a working machine mounting the engine thereon, and it is possible to suppress the manufacturing cost.

In accordance with the third aspect of the present invention, since the exhaust gas inlet pipe is attached to the outer case in such a manner as to cover the exhaust gas inflow port and extend in the longitudinal direction of the outer case, the exhaust gas inlet pipe itself functions as a reinforcing member with respect to the outer case. Therefore, there is obtained such an effect that it is possible to achieve a weight saving as well as it is possible to improve a rigidity of the outer case, without provision of a dedicated reinforcing member. Further, since the number of the constructing parts can be reduced in comparison with the structure provided with the dedicated reinforcing member, it is possible to construct at a low cost.

In accordance with the fourth aspect of the present invention, since the conduction passage of the exhaust gas is constructed by the outer surface of the outer case and the inner surface of the exhaust gas inlet pipe, it is possible to warm up the outer case by the exhaust gas within the exhaust gas inlet pipe (within the conduction passage), and it is possible to suppress the reduction of the temperature of the exhaust gas passing through the exhaust gas purifying device. Therefore, there is such an advantage that it is possible to improve the exhaust gas purifying performance of the exhaust gas purifying device.

The fifth aspect of the present invention further embodies the invention in accordance with the first aspect. In this case, since the exhaust gas inlet side of the exhaust gas inlet pipe is positioned in the center portion in the longitudinal direction of the outer case, and the outer case is positioned between the cooling fan in the one side of the engine and the flywheel housing in the other side, there can be obtained such an effect that the construction of one kind of exhaust gas purifying device can cope with, for example, the specification that the exhaust gas outflow port from the outer case is arranged in the cooling fan side, and the specification that the exhaust-gas outflow port from the outer case is arranged in the flywheel housing side.

In accordance with the sixth aspect of the present invention, since a plurality of filter support bodies are attached to the cylinder head of the engine, and the one end side in the longitudinal direction and the other end side in the longitudinal direction in the outer case are detachably connected to the cylinder head via each of the filter support bodies, there can be obtained such an effect that the exhaust gas purifying device can be arranged with a high rigidity as one of the constructing parts of the engine, in the engine, an exhaust gas countermeasure per equipment of a working vehicle or the like is not necessary, and it is possible to improve a general purpose property of the engine.

In other words, it is possible to support the exhaust gas purifying device with a high rigidity by utilizing the cylinder head corresponding to the high rigidity part of the engine, and it is possible to prevent the exhaust gas purifying device from being damaged due to a vibration or the like. Further, there are such advantages that it is possible to incorporate the exhaust gas purifying device into the engine at the manufacturing place of the engine so as to ship, and it is possible to arrange the engine and the exhaust gas purifying device so as to construct compactly.

DESCRIPTION OF THE PREFERRED EMBODIMENTS

Figure 1:
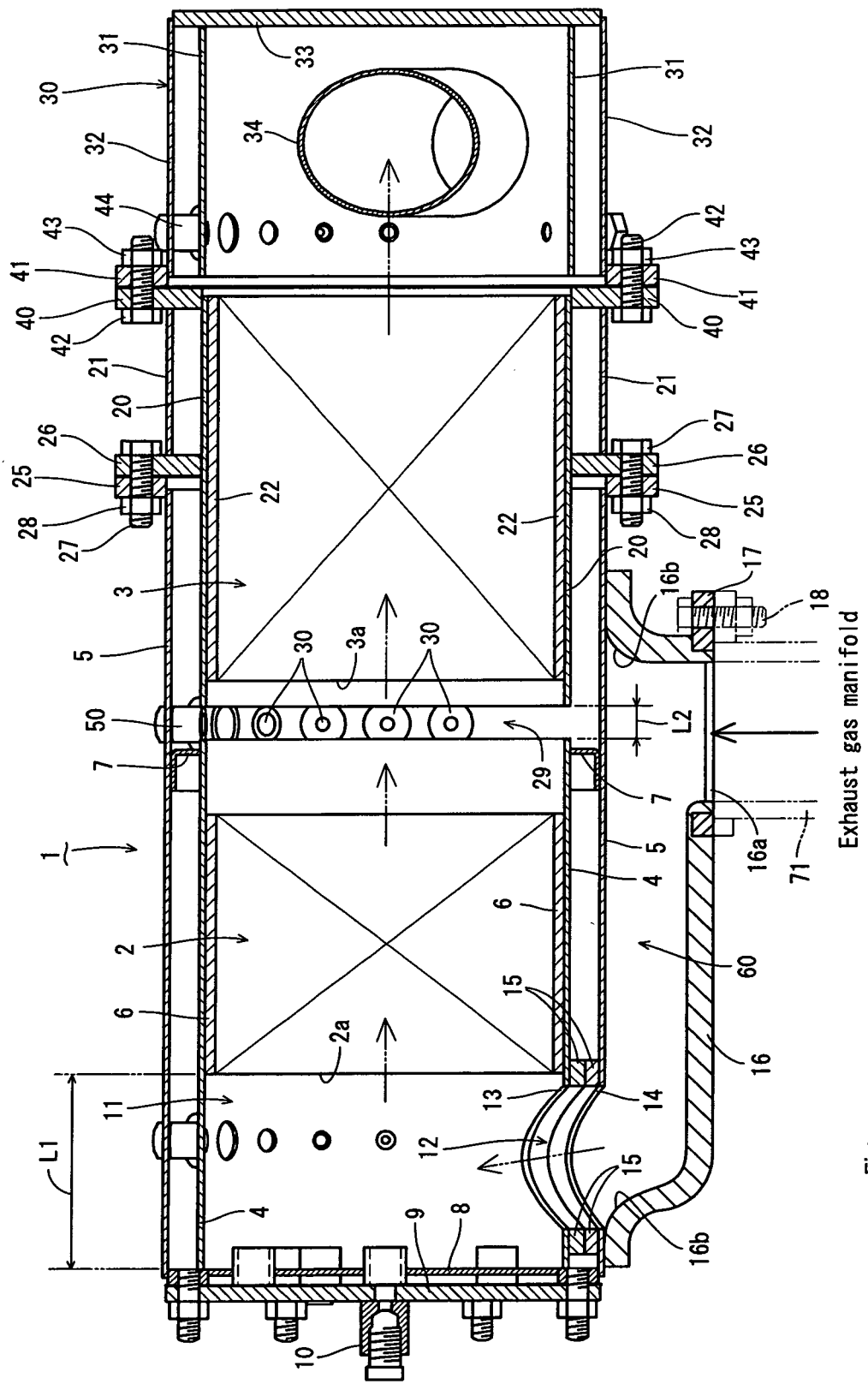
FIG. 1 is a cross sectional view in a front view of an exhaust gas purifying device in accordance with an embodiment of the present invention.
Figure 2:
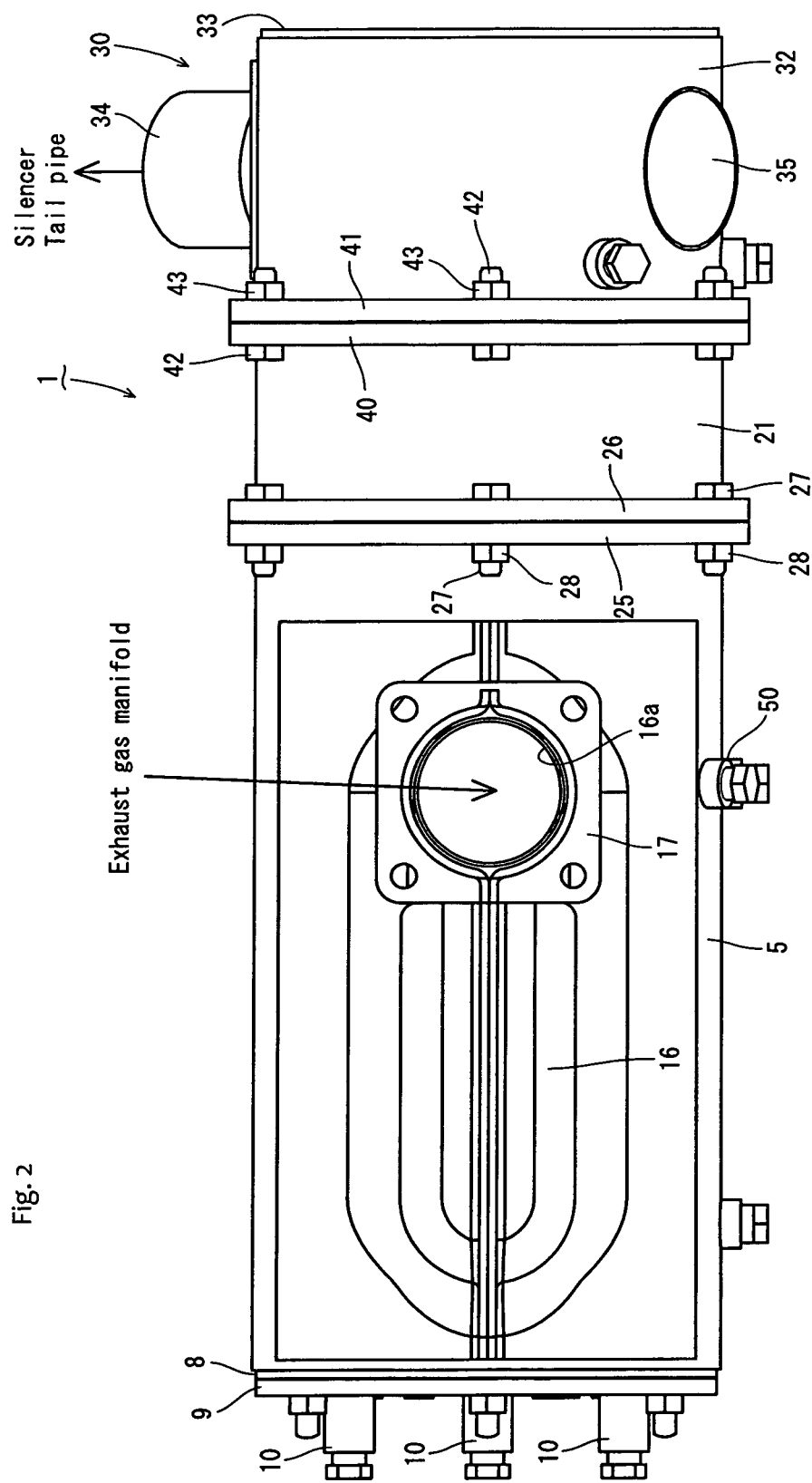
FIG. 2 is a bottom elevational view of an outer appearance of the same.
Figure 3:
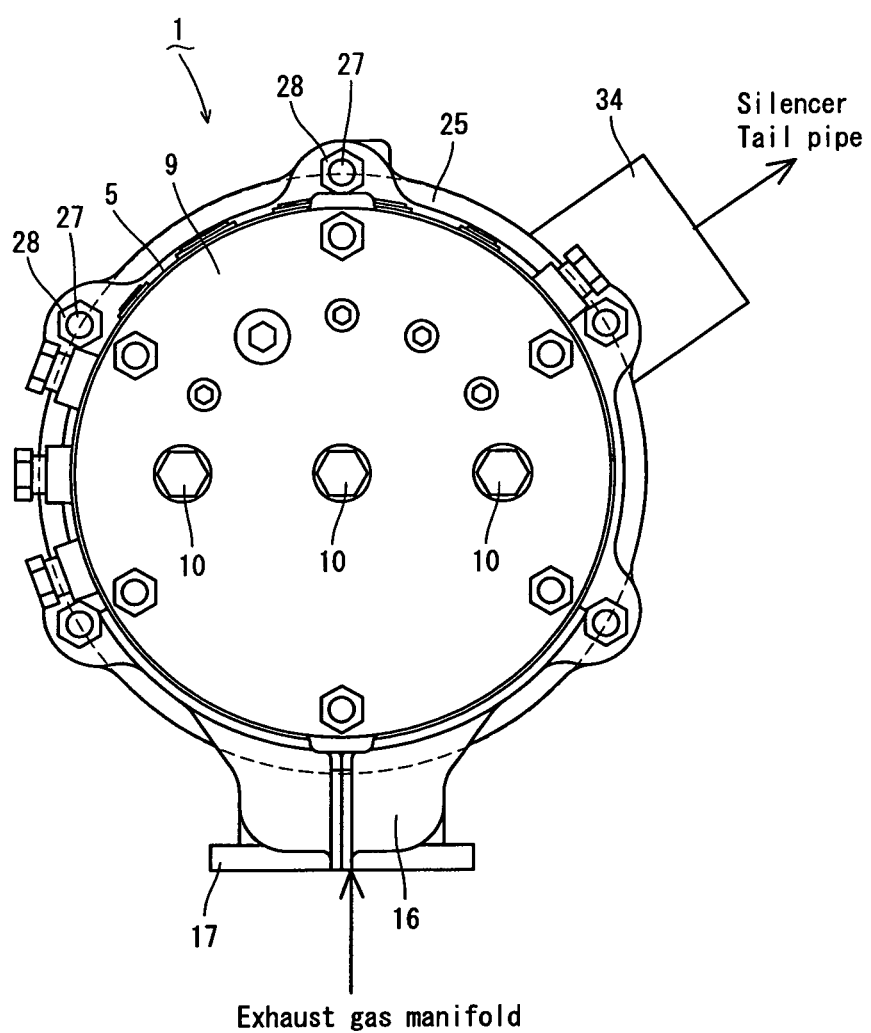
FIG. 3 is a left side elevational view as seen from an exhaust gas inflow side of the same.
Figure 4:
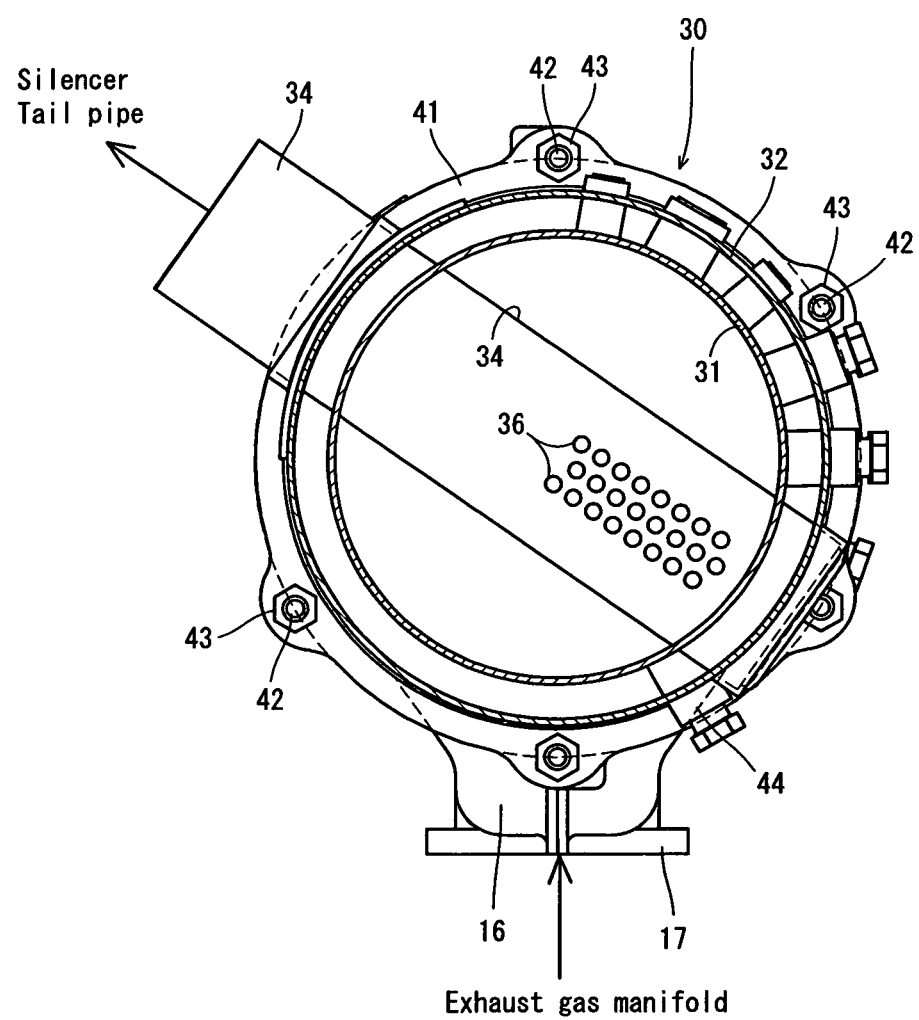
FIG. 4 is a right side cross sectional view as seen from an exhaust gas discharge side of the same.

A description will be given below of an embodiment obtained by specifying the present invention with reference to the accompanying drawings. In this case, in the following description, an exhaust gas inflow port 12 side in a diesel particulate filter 1 is set to a left side, and a silencer 30 side is set to a right side in the same manner.

First of all, a description will be given of a whole structure of an exhaust gas purifying device with reference to FIGS. 1 to 5. As shown in FIGS. 1 to 5, there is provided a continuous reproduction type diesel particulate filter 1 (hereinafter, refer to as DPF) serving as an exhaust gas purifying device in accordance with the present embodiment. The DPF 1 is provided for physically collecting a particulate matter (PM) or the like in the exhaust gas. The DPF 1 is structured such that a diesel oxidation catalyst 2 such as a platinum or the like generating a nitrogen dioxide ($NO_2$), and a soot filter 3 continuously oxidizing and removing the collected particulate matter (PM) at a comparatively low temperature and having a honeycomb construction are arranged in series in a moving direction of the exhaust gas (a direction from a left side to a right side in FIG. 1). DPF 1 is structured such that the soot filter 3 is continuously reproduced. By the DPF 1, it is possible to reduce a carbon oxide (CO) and a hydro carbon (HC) in the exhaust gas, in addition to the removal of the particulate matter (PM) in the exhaust gas.

Figure 5:
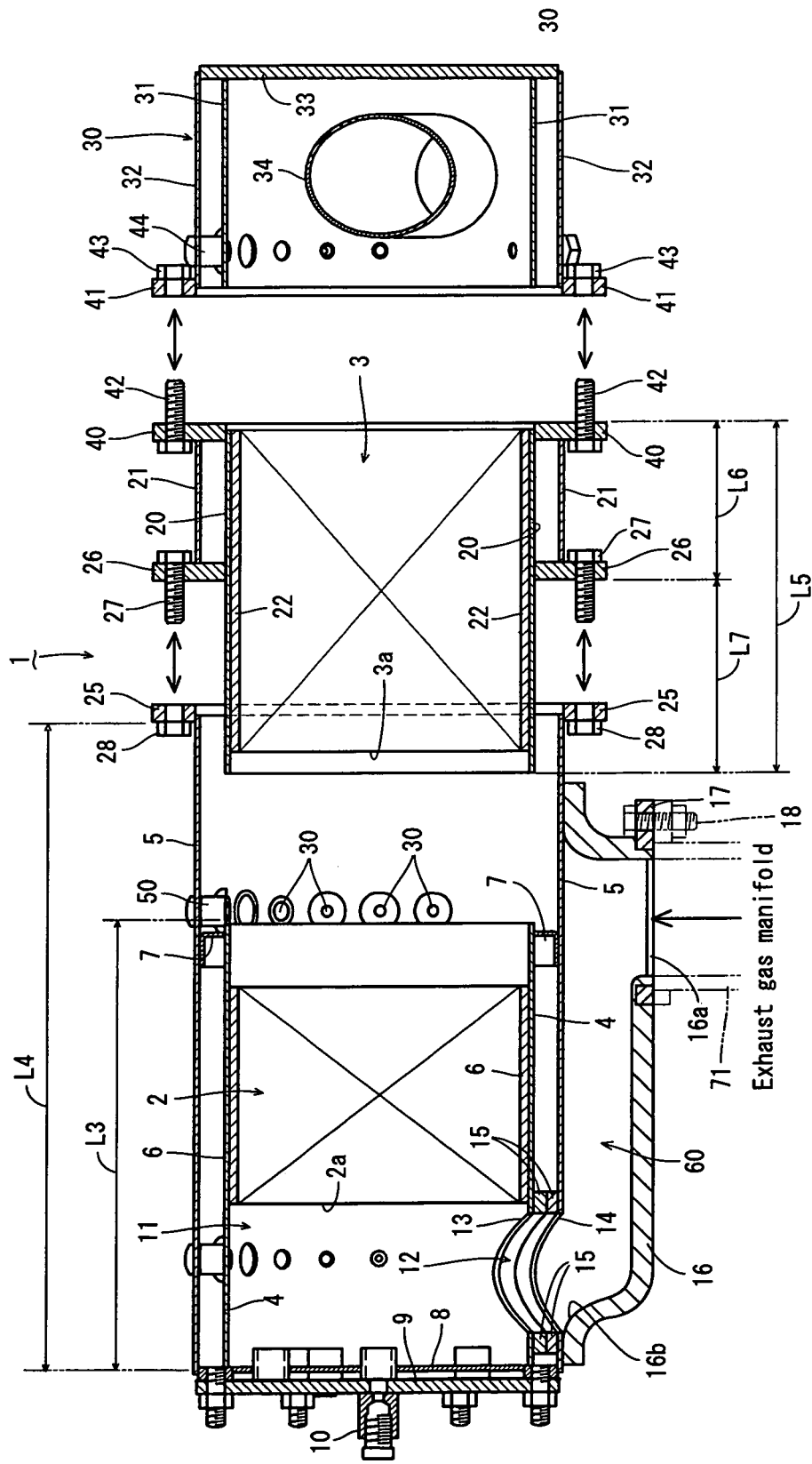
FIG. 5 is an exploded cross sectional view in a front view of FIG. 1.

A description will be given of a mounting structure of the diesel oxidation catalyst 2 with reference to FIGS. 1 and 5. As shown in FIGS. 1 and 5, the diesel oxidation catalyst 2 serving as the gas purifying filter purifying the exhaust gas which the engine discharges, is internally provided in an approximately tubular catalyst inner case 4 made of a heat resisting metal material. The catalyst inner case 4 is internally provided in an approximately tubular catalyst outer case 5 made of a heat resisting metal material. In other words, the catalyst inner case 4 is fitted to an outer side of the diesel oxidation catalyst 2 via a catalyst heat insulating material 6 having a mat shape and made of a ceramic fiber. Further, the catalyst outer case 5 is fitted to an outer side of the catalyst inner case 4 via a support body 7 having an I-shaped end face and made of a thin plate. In this case, the diesel oxidation catalyst 2 is protected by the catalyst heat insulating material 6. A stress (a deforming force of the catalyst outer case 5 transmitted to the catalyst inner case 4 is reduced by the thin plate support body 7.

As shown in FIGS. 1 and 5, a disc-like left lid body 8 is firmly fixed to a left end portion of the catalyst inner case 4 and the catalyst outer case 5 in accordance with a welding. A sensor connection plug 10 is firmly fixed to the left lid body 8 via a seat plate body 9. A left end face 2a of the diesel oxidation catalyst 2 and the left lid body 8 are opposed so as to be spaced only at a fixed distance L1 for a gas inflow space. An exhaust gas inflow space 11 is formed between the left end face 2a of the diesel oxidation catalyst 2 and the left lid body 8. In this case, an inlet side exhaust gas pressure sensor, an inlet side exhaust gas temperature sensor and the like (which are not illustrated) are connected to the sensor connection plug 10.

Figure 9:
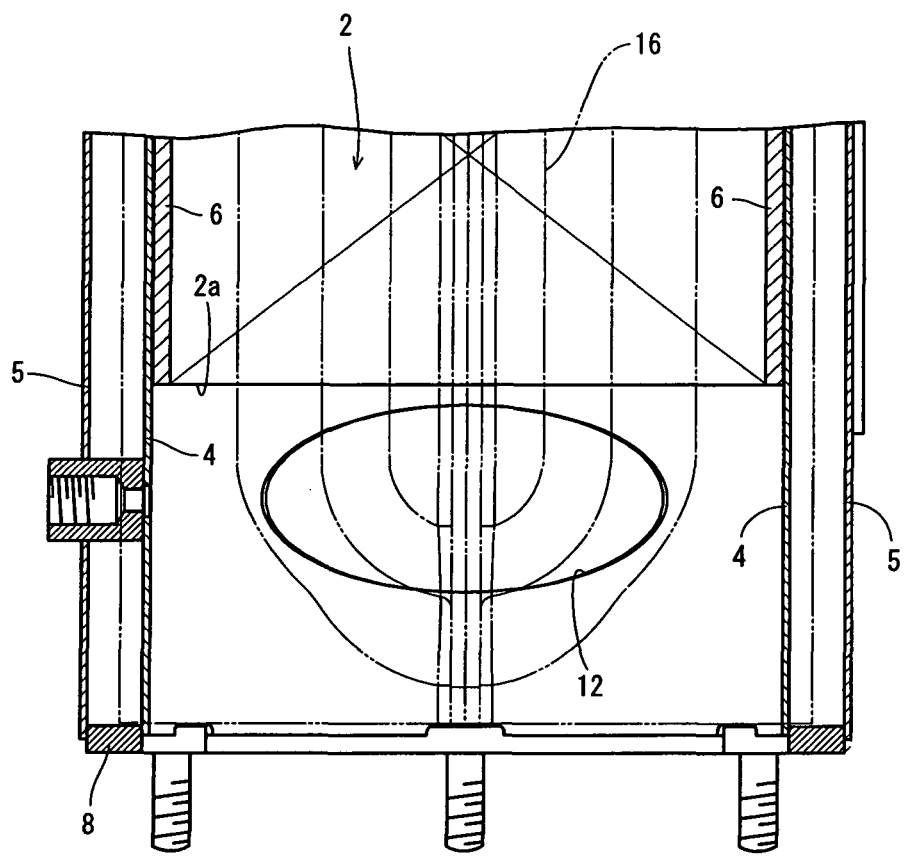
FIG. 9 is an enlarged cross sectional view in a plan view of the exhaust gas inflow side of the same.

As shown in FIGS. 1, 5, and 9, an exhaust gas inflow port 12 is open to one end side in a longitudinal direction of the catalyst inner case 4 and the catalyst outer case 5. The exhaust gas inflow port 12 in accordance with the embodiment is formed in a left end portion of the catalyst inner case 4 and the catalyst outer case 5 and has an oval shape. The exhaust gas inflow port 12 having the oval shape is formed in such a manner that an exhaust gas moving direction (a direction of center lines of the cases 4 and 5) is a short diameter, and a direction which is orthogonal to the exhaust gas moving direction (a circumferential direction of the cases 4 and 5) is a long diameter. An occlusion ring body 15 is firmly fixed so as to be pinched between an open edge 13 of the catalyst inner case 4 and an open edge 14 of the catalyst outer case 5. A gap between the open edge 13 of the catalyst inner case 4 and the open edge 14 of the catalyst outer case 5 is closed by the occlusion ring body 15. The occlusion ring body 15 prevents the exhaust gas exhausted from flowing into the portion between the catalyst inner case 4 and the catalyst outer case 5.

As shown in FIGS. 1, 3, 5, and 8, an exhaust gas inlet pipe 16 is arranged in an outer surface of the catalyst outer case 5 in which the exhaust gas inflow port 12 is formed. The exhaust gas inlet pipe 16 is formed as a half tubular shape which is open upward, and is fixed by welding to an outer surface of the catalyst outer case 5 in such a manner that a rectangular upward open end portion 16b corresponding to a large diameter side covers the exhaust gas inflow port 12 and extends in a longitudinal (lateral) direction of the catalyst outer case 5. Therefore, the upward open end portion 16b corresponding to the exhaust gas outlet side of the exhaust gas inlet pipe 16 is continuously connected to the exhaust gas inflow port 12 of the catalyst outer case 5.

A downward open end portion 16a formed as a small diameter complete round shape is open as an exhaust gas inlet side to a right end portion corresponding to a midstream portion in the longitudinal direction of the catalyst outer case 5 in the exhaust gas inlet pipe 16, and an exhaust gas connection flange body 17 is fixed by welding to an outer peripheral portion of the downward open end portion 16a. The exhaust gas connection flange body 17 is fastened to an exhaust gas manifold 71 of a diesel engine 70 mentioned below, via a bolt 18.

Although an illustration will be omitted, a positional relationship of insertion holes of the exhaust gas connection flange body 17 and the exhaust gas manifold 71 is set in such a manner that the exhaust gas connection flange body 17 can be fastened by the bolt 18 to the exhaust gas manifold 71 even in a state in which a lateral attaching direction of the DPF 1 is inverted (a laterally inverted state), in this case. In other words, the downward open end portion 16a of the exhaust gas inlet pipe 16 is connected to the exhaust gas manifold 71 in such a manner that the attaching direction can be changed.

The downward open end portion 16a of the exhaust gas inlet pipe 16 in the embodiment is positioned approximately in a center portion in a longitudinal (lateral) direction in the DPF 1 (the outer case 5, 21, or 32). Accordingly, a length in an exhaust gas moving direction (a lateral direction) of the DPF 1 is set to such a dimension as to be approximately divided equally with respect to the downward open end portion 16a of the exhaust gas inlet pipe 16.

Figure 8:
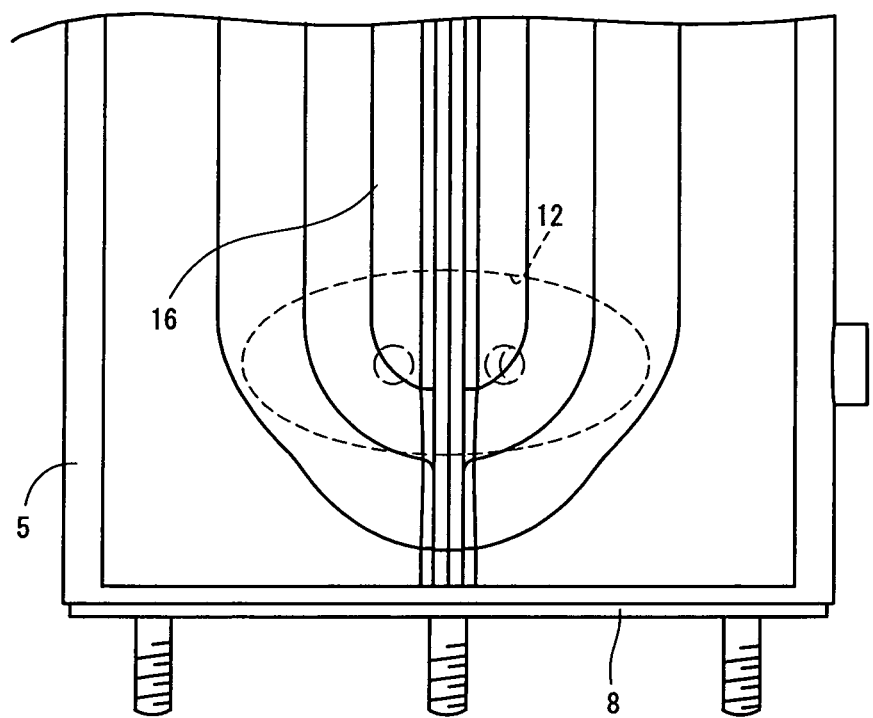
FIG. 8 is an enlarged bottom elevational view of the exhaust gas inflow side of the same.

As shown in FIGS. 1, 5, and 8, a left end portion side of the exhaust gas inlet pipe 16 covers the exhaust gas inlet port 12 of the catalyst outer case 5, and the downward open end portion 16a corresponding to the exhaust gas inlet side is formed in a right end portion of the exhaust gas inlet pipe 16. In other words, the downward open end portion 16a of the exhaust gas inlet pipe 16 is provided so as to be offset (displaced) to an exhaust gas movement downstream side (a right side of the catalyst outer case 5) with respect to the oval-shaped exhausted gas inlet port 12.

Further, since the upward open end portion 16b of the exhaust gas inlet pipe 16 is fixed by welding to the outer surface of the catalyst outer case 5 in such a manner as to cover the exhaust gas inflow port 12 and extend in the longitudinal (lateral) direction of the catalyst outer case 5, the exhaust gas conduction passage 60 is constructed by the outer surface of the catalyst outer case 5 and the inner surface of the exhaust gas inlet pipe 16.

On the basis of the structure mentioned above, the exhaust gas of the engine 70 enters into the exhaust gas inlet pipe 16 from the exhaust gas manifold 71, enters into the exhaust gas inflow space 11 from the exhaust gas inlet pipe 16 via the exhaust gas inflow port 12, and is supplied to the diesel oxidation catalyst 2 from the left end face 2a thereof. On the basis of an oxidation action of the diesel oxidation catalyst 2, the nitrogen dioxide ($NO_2$) is generated. Describing below in detail, in the case that the DPF 1 is assembled in the engine 70, the catalyst outer case 5 is firmly fixed to a cylinder head 72 or the like of the engine 70 via support leg bodies 19a to 19c.

A description will be given of a mounting structure of the soot filter 3 with reference to FIGS. 1 and 5. As shown in FIGS. 1 and 5, the soot filter 3 serving as a gas purifying filter purifying the exhaust gas which the engine 70 discharges is internally provided in an approximately tubular filter inner case 20 made of a heat resisting metal material. The inner case 4 is internally provided in an approximately tubular filter outer case 21 made of a heat resisting metal material. In other words, the filter inner case 20 is fitted to an outer side of the soot filter 3 via a filter heat insulating material 22 having a mat shape and made of a ceramic fiber. In this case, the soot filter 3 is protected by the filter heat insulating material 22.

As shown in FIGS. 1 and 5, a catalyst side flange 25 is welded to an end portion in the exhaust gas movement downstream side (the right side) of the catalyst outer case 5. A filter side flange 26 is welded to an intermediate in the exhaust gas moving direction of the filter inner case 20, and an end portion in the exhaust gas movement upstream side (the left side) of the filter outer case 21. A catalyst side flange 25, and a filter side flange 26 are detachably fastened by a bolt 27 and a nut 28. In this case, a diameter dimension of the cylindrical catalyst inner case 4, and a diameter dimension of the cylindrical filter inner case 20 are approximately the same dimension. Further, a diameter dimension of the cylindrical catalyst outer case 5, and a diameter dimension of the cylindrical filter outer case 21 are approximately the same dimension.

As shown in FIG. 1, in a state in which the filter outer case 21 is connected to the catalyst outer case 5 via the catalyst side flange 25 and the filter side flange 26, the end portion in the exhaust gas movement upstream side (the left side) of the filter inner case 20 stands face to fact to the end portion in the exhaust gas movement downstream side (the right side) of the catalyst inner case 4 so as to be spaced at a sensor mounting fixed distance L2. In other words, a sensor mounting space 29 is formed between the end portion in the exhaust gas movement downstream side (the right side) of the catalyst inner case 4, and the end portion in the exhaust gas movement upstream side (the left side) of the filter inner case 20. A sensor connection plug 50 is firmly fixed to the catalyst outer case 5 at a position of the sensor mounting space 29. To the sensor connection plug 50, there are connected a filter inlet side exhaust gas pressure sensor, a filter inlet side exhaust gas temperature sensor (a thermistor) and the like which are not illustrated.

As shown in FIG. 5, a cylinder length L4 in the exhaust gas moving direction of the catalyst outer case 5 is formed longer than a cylinder length L3 in the exhaust gas moving direction of the catalyst inner case 4. A cylinder length L6 in the exhaust gas moving direction of the filter outer case 21 is formed shorter than a cylinder length L5 in the exhaust gas moving direction of the filter inner case 20. The structure is made such that a length (L2+L3+L5) obtained by adding the fixed distance L2 of the sensor mounting space 29, the cylinder length L3 of the catalyst inner case 4 and the cylinder length L5 of the filter inner case 20 becomes approximately equal to a length (L4+L6) obtained by adding the cylinder length L4 of the catalyst outer case 5 and the cylinder length L6 of the filter outer case 21. The end portion in the exhaust gas movement upstream side (the left side) of the filter inner case 20 protrudes from the end portion in the exhaust gas movement upstream side (the left side) of the filter outer case 21 at a difference between these lengths (L7=L5−L6). In other words, in the case that the filter outer case 21 is connected to the catalyst outer case 5, the end portion in the exhaust gas movement upstream side (the left side) of the filter inner case 20 is internally inserted to the exhaust gas movement downstream side (the right side) of the catalyst outer case 5 only at the overlapping dimension L7.

On the basis of the structure mentioned above, the nitrogen dioxide (NO2) generated by the oxidation action of the diesel oxidation catalyst 2 is supplied to the soot filter 3 from a left end face 3a thereof. The collected particulate matter (PM) in the exhaust gas of the diesel engine 70 collected by the soot filter 3 is continuously oxidized and removed at a comparatively low temperature by the nitrogen dioxide ($NO_2$). In addition to the removal of the particulate matter (PM) in the exhaust gas of the diesel engine 70, a carbon oxide (CO) and a hydro carbon (HC) in the exhaust gas of the diesel engine 70 are reduced.

As shown in FIGS. 1 to 5, in the exhaust gas purifying device provided with the diesel oxidation catalyst 2 and the soot filter 3 which serve as the gas purifying filter purifying the exhaust gas which the diesel engine 70 discharges, the catalyst inner case 4 and the filter inner case 20 which are internally provided with the diesel oxidation catalyst 2 and the soot filter 3, and the catalyst outer case 5 and the filter outer case 21 which are internally provided with the catalyst inner case 4 and the filter inner case 20, plural sets of diesel oxidation catalysts 2 and soot filters 3, the catalyst inner case 4 and the filter inner case 20, and the catalyst outer case 5 and the filter outer case 21 are provided, and the catalyst side flange 25 and the filter side flange 26 which serve as the flange body connecting the catalyst outer case 5 and the filter outer case 21 are structured such as to be offset with respect to the connection boundary position between the diesel oxidation catalyst 2 and the soot filter 3. Accordingly, it is possible to reduce the distance of the connection portion between the diesel oxidation catalyst 2 and the soot filter 3, and it is possible to shorten the connection length of the catalyst outer case 5 and the filter outer case 21.

Further, the gas sensor or the like can be easily arranged at the connection boundary position of the diesel oxidation catalyst 2 and the soot filter 3. Since it is possible to shorten the length in the exhaust gas moving direction of the catalyst outer case 5 and the filter outer case 21, it is possible to achieve an improvement of a rigidity of the catalyst outer case 5 and the filter outer case 21, and a weight saving.

As shown in FIGS. 1 to 5, in the structure in which two kinds of diesel oxidation catalysts 2 and soot filters 3 are provided, since the catalyst outer case 5 internally provided with the catalyst inner case 4 of the other diesel oxidation catalyst 2 is structured such as to lap over the filter inner case 20 internally provided with the one soot filter 3, it is possible to shorten the length in the exhaust gas moving direction of the catalyst outer case 5 and the filter outer case 21 while securing the length in the exhaust gas moving direction of the diesel oxidation catalyst 2 and the soot filter 3.

Further, since the catalyst inner case 4 (the other diesel oxidation catalyst 2) over which the catalyst outer case 5 laps is exposed largely to the external portion on the basis of a separation (a disassembly) of the catalyst outer case 5 and the filter outer case 21, an exposure range of the catalyst inner case 4 (the other diesel oxidation catalyst 2) is increased, and a maintenance work such as a soot removal in the one soot filter 3 or the like can be easily executed.

As shown in FIGS. 1 to 5, since the diesel oxidation catalysts 2 and the soot filters 3 are provided as the plural sets of gas purifying filters, and the catalyst side flange 25 and the filter side flange 26 are structured in the outer peripheral side of the soot filter 3 such as to be offset, the end portion of the inner case 20 in the exhaust gas inlet side of the soot filter 3 can be largely exposed from the end face of the outer case 21 on the basis of the separation of the catalyst outer case 5 and the filter outer case 21, and it is possible to easily execute a maintenance work such as the removal of the phosphor or the like attached to the soot filter 3 and the inner case 20.

As shown in FIGS. 1 to 5, in the structure in which two kinds of diesel oxidation catalysts 2 and soot filters 3 are provided, since the sensor mounting space 29 is formed between the catalyst inner case 4 internally provided with the one diesel oxidation catalyst 2, and the filter inner case 20 internally provided with the other soot filter 3, it is possible to easily arrange the gas sensor or the like in the sensor mounting space 29 at the connection boundary position of the diesel oxidation catalyst 2 and the soot filter 3, while reducing the connection length in the exhaust gas moving direction of the catalyst outer case 5 and the filter outer case 21 and achieving an improvement of the rigidity of the catalyst outer case 5 and the filter outer case 21, and a weight saving.

As shown in FIGS. 1 to 5, since the structure is made such that the sensor connection plug 50 serving as the sensor support body is assembled in the catalyst outer case 5 which is lapped over the filter inner case 20, and the gas sensor such as the filter inlet side exhaust gas pressure sensor, the filter inlet side exhaust gas temperature sensor (the thermistor) or the like which is not illustrated is arranged at the connection boundary position of the diesel oxidation catalyst 2 and the soot filter 3 via the sensor connection plug 50, it is possible to compactly install the sensor connection plug 50 at the connection boundary position of the diesel oxidation catalyst 2 and the soot filter 3, while intending to improve the rigidity of the catalyst outer case 5, the filter outer case 21 or the like and save weight thereof.

In this case, the diesel oxidation catalyst 2 and the soot filter 3 are provided as the gas purifying filter purifying the exhaust gas which the engine discharges, as mentioned above, however, an NOx selectively reduction catalyst (an NOx removal catalyst) and an ammonia removal catalyst may be provided in place of the diesel oxidation catalyst 2 and the soot filter 3, the NOx selectively reduction catalyst reducing a nitrogen oxide (NOx) in the exhaust gas of the engine 70 by an ammonia ($NH_3$) generated by an additive of urea (reducing agent), and the ammonia removal catalyst removing a residual ammonia discharged from the NOx selectively reduction catalyst.

As mentioned above, in the case that the NOx selectively reduction catalyst (the NOx removal catalyst) is provided in the catalyst inner case 4, and the ammonia removal catalyst is provided in the filter inner case 20, as the gas purifying filter, the nitrogen oxide (NOx) in the exhaust gas which the engine discharges is reduced, and can be discharged as a harmless nitrogen gas ($N_2$).

As shown in FIGS. 1 to 5, in the exhaust gas purifying device provided with the diesel oxidation catalyst 2 and the soot filter 3 which serve as the gas purifying filter purifying the exhaust gas which the diesel engine 70 discharges, the catalyst inner case 4 and the filter inner case 20 which are internally provided with the diesel oxidation catalyst 2 and the soot filter 3, and the catalyst outer case 5 and the filter outer case 21 which are internally provided with the catalyst inner case 4 and the filter inner case 20, the catalyst inner case 4 and the filter inner case 20 are connected to the catalyst outer case 5 and the filter outer case 21, and the exhaust gas inlet pipe 16 serving as the inlet constructing part to which the external stress is applied, is arranged in the catalyst outer case 5.

Accordingly, it is possible to support the external stress by the catalyst outer case 5, and it is possible to reduce the external stress acting as a deforming force on the catalyst inner case 4 and the filter inner case 20. In addition that it is possible to improve a processing capacity and a regeneration capacity of the diesel oxidation catalyst 2 and the soot filter 3, by improving a heat insulating property of the diesel oxidation catalyst 2 and the soot filter 3 on the basis of a double structure of the catalyst inner case 4 or the filter inner case 20 and the catalyst outer case 5 or the filter outer case 21, it is possible to easily prevent the support of the diesel oxidation catalyst 2 and the soot filter 3 from becoming inappropriate, for example, due to a conduction of the vibration from the engine, a strain of the welding process or the like.

As shown in FIGS. 1 to 5, the plural sets of diesel oxidation catalysts 2 and soot filters 3, the catalyst inner cases 4 and the filter inner cases 20, and the catalyst outer cases 5 and the filter outer cases 21 are provided, and the plural sets of catalyst outer cases 5 and filter outer cases 21 are connected by the catalyst side flange 25 and the filter side flange 26 which serve as the flange body. Accordingly, taking into consideration the structure of the exhaust gas inlet pipe 16, the movement of the exhaust gas between the plural sets of diesel oxidation catalysts 2 and soot filters 3, and the like, it is possible to functionally construct the plural sets of catalyst inner cases 4 and filter inner cases 20, and the plural sets of catalyst outer cases 5 and filter outer cases 21. It is possible to easily improve the processing capacity and the regenerating capacity of the plural sets of diesel oxidation catalysts 2 and soot filters 3.

As shown in FIGS. 1 to 5, the length in the exhaust gas moving direction of the catalyst inner case 4 and the filter inner case 20 is differentiated from the length in the exhaust gas moving direction of the catalyst outer case 5 and the filter outer case 21. Accordingly, it is possible to arrange the flange body connecting the catalyst outer case 5 and the filter outer case 21 so as to be offset with respect to the joint position of the plural sets of diesel oxidation catalyst 2 and the soot filter 3. It is possible to easily reduce or enlarge the mounting distance of the plural sets of diesel oxidation catalyst 2 and soot filers 3.

As shown in FIGS. 1 to 5, the plural sets of diesel oxidation catalysts 2 and soot filters 3, the catalyst inner cases 4 and the filter inner cases 20, and the catalyst outer cases 5 and the filter outer cases 21 are provided, the catalyst side flange 25 and the filter side flange 26 connecting the plural sets of catalyst outer cases 5 and filter outer cases 21 are structured such as to be offset, with respect to the joint position of the plural sets of diesel oxidation catalysts 2 and soot filters 3, and the catalyst outer case 5 opposed to the other diesel oxidation catalyst 2 is structured such as to lap over the filter inner case 20 opposed to the one soot filter 3.

Accordingly, it is possible to easily arrange the sensor or the like in the joint between the plural sets of diesel oxidation catalysts 2 and soot filters 3, while it is possible to reduce the joint distance of the plural sets of diesel oxidation catalysts 2 and soot filters 3. It is possible to achieve an improvement of rigidity and a weight saving of the plural sets of catalyst outer cases 5 and filter outer cases 21, by shortening the length in the exhaust gas moving direction of the plural sets of catalyst outer cases 5 and filter outer cases 21. It is possible to shorten the length in the exhaust gas moving direction of the plural sets of catalyst outer cases 5 and filter outer cases 21, by reducing the joint distance of the plural sets of diesel oxidation catalysts 2 and soot filters 3.

A description will be given of a mounting structure of a silencer 30 with reference to FIGS. 1 to 3 and FIGS. 5 to 7. As shown in FIGS. 1 to 3 and FIG. 5, the silencer 30 damping an exhaust gas noise which the diesel engine 70 discharges has an approximately tube type noise reduction inner case 31 made of a heat resisting metal material, an approximately tube type noise reduction outer case 32 made of a heat resisting metal material, and a disc shaped right lid body 33 firmly fixed to a right end portion of the noise reduction inner case 31 and the noise reduction outer case 32 by welding. The noise reduction outer case 32 is internally provided with the noise reduction inner case 31. In this case, the cylindrical noise reduction inner case 31 has approximately the same dimension as the diameter of the cylindrical catalyst inner case 4, and the diameter of the cylindrical filter inner case 20. Further, the cylindrical noise reduction outer case 32 has approximately the same dimension as the diameter of the cylindrical catalyst outer case 5, and the diameter of the cylindrical filter outer case 21.

As shown in FIGS. 4 to 7, an exhaust gas outlet pipe 34 is penetrated the noise reduction inner case 31 and the noise reduction outer case 32. One end side of the exhaust gas outlet pipe 34 is closed by an outlet lid body 35. A lot of exhaust holes 36 are perforated in a whole of the exhaust gas outlet pipe 34 in an inner portion of the noise reduction inner case 31. An inner portion of the noise reduction inner case 31 is communicated with the exhaust gas outlet pipe 34 via a lot of exhaust gas holes 36. A silencer or a tail pipe which is not illustrated is connected to the other end side of the exhaust gas outlet pipe 34.

Figure 6:
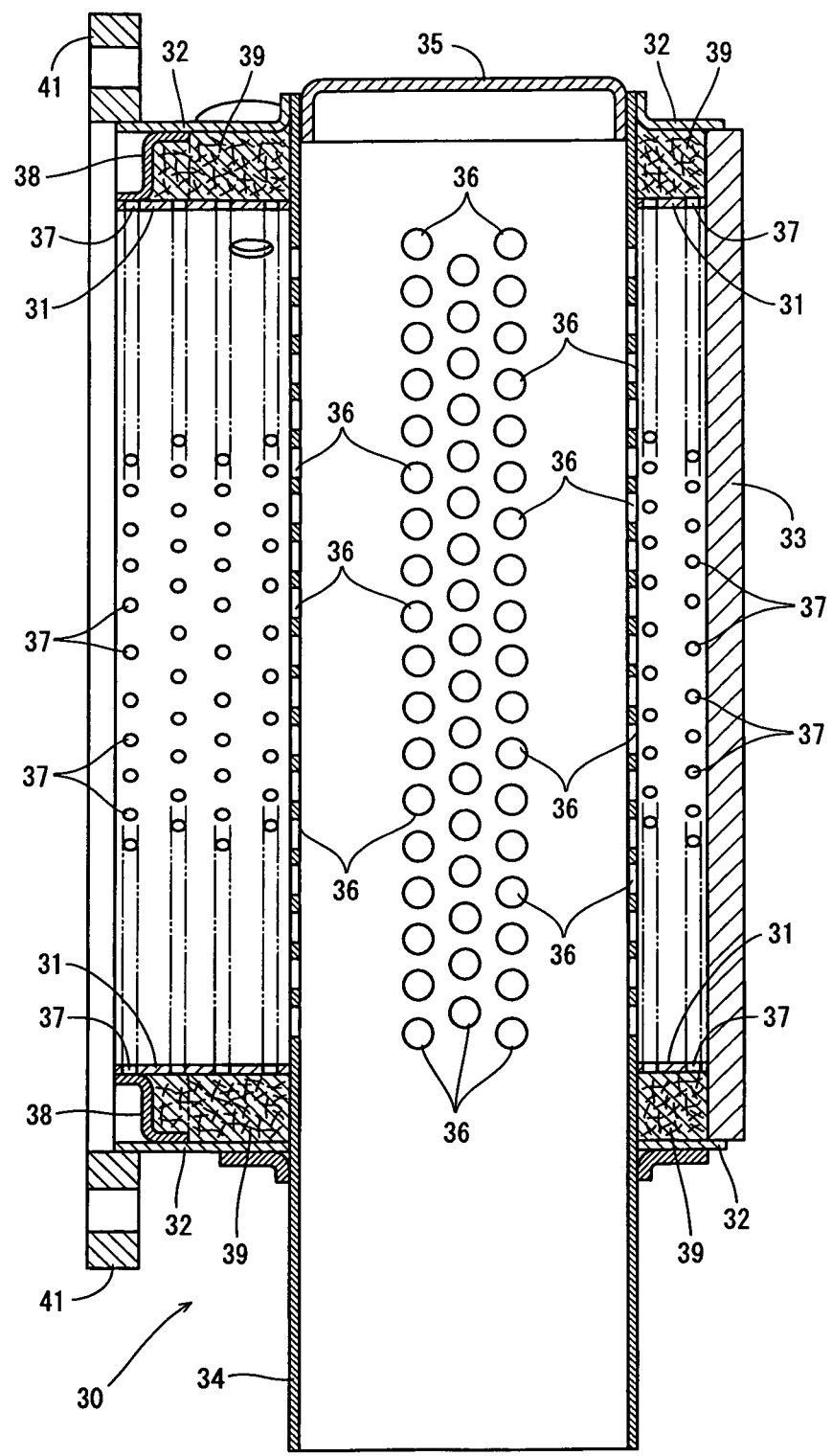
FIG. 6 is an enlarged cross sectional view in a front view of the exhaust gas discharge side of the same.
Figure 7:
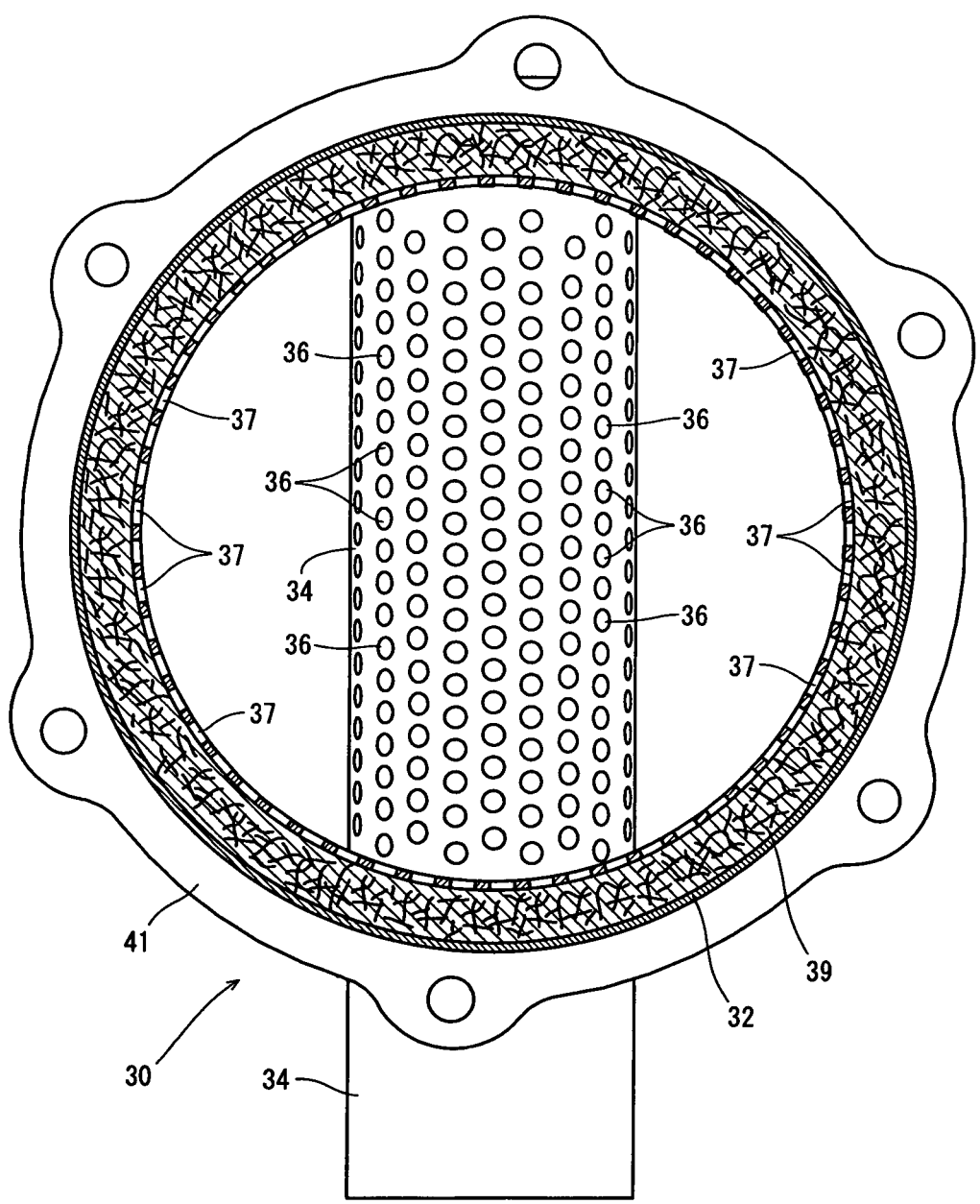
FIG. 7 is an enlarged cross sectional view in a side elevational view of the exhaust gas discharge side of the same.

As shown in FIGS. 6 and 7, a lot of noise reduction holes 37 are perforated in the noise reduction inner case 31. An inner portion of the noise reduction inner case 31 is communicated with a portion between the noise reduction inner case 31 and the noise reduction outer case 32 via a lot of noise reduction holes 37. A space between the noise reduction inner case 31 and the noise reduction outer case 32 is closed by the right lid body 33 and a support body 38 made of a thin plate. A noise reduction material 39 made of a ceramic fiber is filled between the noise reduction inner case 31 and the noise reduction outer case 32. An end portion in an exhaust gas movement upstream side (a left side) of the noise reduction case 31 is connected to an end portion in an exhaust gas movement upstream side (a left side) of the noise reduction outer case 32 via the thin plate support body 38.

On the basis of the structure mentioned above, the exhaust gas is discharged from the inner side of the noise reduction inner case 31 via the exhaust gas outlet pipe 34. Further, in the inner portion of the noise reduction inner case 31, an exhaust gas noise (mainly constructed by a noise in a high frequency band) is absorbed from a lot of noise reduction holes 37 to the noise reduction material 39. An undesired sound of the exhaust gas discharged from the outlet side of the exhaust gas outlet pipe 34 is damped.

As shown in FIGS. 1 and 5, a filter side outlet flange 40 is welded to an end portion in an exhaust gas movement downstream side (a right side) of the filter inner case 20 and the filter outer case 21. A noise reduction side flange 41 is welded to an end portion in an exhaust gas movement upstream side (a left side) of the noise reduction outer case 32. The filter side outlet flange 40 and the noise reduction side flange 41 are detachably fastened by a bolt 42 and a nut 43. In this case, a sensor connection plug 44 is firmly fixed to the filter inner case 20 and the filter outer case 21. To the sensor connection plug 44, there are connected an outlet side exhaust gas pressure sensor, an outlet side exhaust gas temperature sensor (a thermistor) and the like which are not illustrated.

As shown in FIGS. 1 and 2, and FIGS. 5 to 7, in the exhaust gas purifying device provided with the diesel oxidation catalyst 2 or the soot filter 3 which serves as the gas purification filter purifying the exhaust gas which the diesel engine 70 discharges, the catalyst inner case 4 or the filter inner case 20 which serves as the inner case internally provided with the diesel oxidation catalyst 2 or the soot filter 3, and the catalyst outer case 5 or the filter outer case 21 which serves as the outer case internally provided with the catalyst inner case 4 or the filter inner case 20, since the noise reduction material 39 serving as the exhaust gas damping body damping the exhaust gas noise of the exhaust gas which the diesel engine 70 discharges is provided, and the noise reduction material 39 is arranged in the end portion close to the exhaust gas outlet of the catalyst outer case 5 or the filter outer case 21, it is possible to easily add a noise reduction function of the exhaust gas without changing the structure of the diesel oxidation catalyst 2 or the soot filter 3, while maintaining the exhaust gas purification function of the diesel oxidation catalyst 2 or the soot filter 3. For example, it is possible to easily construct an exhaust gas structure in which the tail pipe is directly connected to the outer case, an exhaust gas structure which further improves a noise reduction function of the existing silencer, and the like.

Further, it is possible to easily execute a high frequency reduction countermeasure of the exhaust gas which is hard to be executed in the position of the diesel oxidation catalyst 2 or the soot filter 3. For example, it is possible to easily install a noise reduction structure (the noise reduction material 39) formed by a punch hole and a fiber mat.

As shown in FIGS. 5 to 7, since the structure is made such that the silencer 30 having the noise reduction material 39 is provided, and the silencer 30 is detachably connected to the exhaust gas outlet side end portion of the filter outer case 21, it is possible to easily change the noise reduction function of the exhaust gas in the diesel oxidation catalyst 2 or the soot filter 3 portion.

As shown in FIGS. 5 to 7, since the structure is made such that the silencer 30 having the noise reduction material 39 is provided, the catalyst outer case 5 or the filter outer case 21 and the silencer 30 are formed as the cylindrical shape having approximately the same outer diameter, respectively, the filter side outlet flange 40 serving as the ring shaped flange body is provided in the end portion close to the exhaust gas outlet of the filter outer case 21, and the noise reduction material 39 is detachably connected to the end portion close to the exhaust gas outlet of the filter outer case 21 via the filter side outlet flange 40, the silencer 30 can be incorporated compactly only by elongating the mounting dimension of the catalyst outer case 5 or the filter outer case 21 in the exhaust gas moving direction, on the basis of the silencer 30 having approximately the same outer diameter being connected to the filter outer case 21 by the filter side outlet flange 40. For example, the catalyst outer case 5 or the filter outer case 21 can be easily installed while being close to the side surface of the exhaust gas discharge portion of the diesel engine 70.

Further, it is possible to easily execute the high frequency reduction countermeasure of the exhaust gas by installing the noise reduction material 39, while improving the gas purifying function of the diesel oxidation catalyst 2 or the soot filter 3, on the basis of temperature maintenance of the exhaust gas.

As shown in FIGS. 5 to 7, since the structure is made such that the noise reduction inner case 31 and the noise reduction outer case 32, and the exhaust gas outlet pipe 34 are provided, the noise reduction inner case 31 and the noise reduction outer case 32 serving as the silencer casing in which the noise reduction material 39 is installed, and the exhaust gas outlet pipe 34 having the closed one end and the other end side communicated with the tail pipe (not shown), the exhaust gas hole 36 forming portion of the exhaust gas outlet pipe 34 is penetrated the noise reduction inner case 31 and the noise reduction outer case 32, and the noise reduction inner case 31 and the noise reduction outer case 32 are detachably connected to the exhaust gas outlet side end portion of the filter outer case 21 via the filter side outlet flange 40, it is possible to easily change the noise reduction function of the exhaust gas in the position of the diesel oxidation catalyst 2 or the soot filter 3, by attaching and detaching the noise reduction inner case 31 and the noise reduction outer case 32. For example, it is possible to easily construct an exhaust gas structure or the like further improving the noise reduction function of the exhaust gas, by installing a silencer (not shown) in addition to the noise reduction inner case 31 and the noise reduction outer case 32.

On the other hand, it is possible to easily construct an exhaust gas structure in which the tail pipe (not shown) is connected directly to the filter outer case 21, by arranging the noise reduction inner case 31 and the noise reduction outer case 32 in which the noise reduction material 39 is not installed. Further, it is possible to easily construct a noise reduction structure of the noise reduction material 39 (the punch hole, the fiber mat and the like) within the noise reduction inner case 31 and the noise reduction outer case 32, as the high frequency reduction countermeasure of the exhaust gas which is hard to be executed in the position of the diesel oxidation catalyst 2 or the soot filter 3.

As shown in FIGS. 5 to 7, since the silencer casing has the cylindrical noise reduction inner case 31 and the cylindrical noise reduction outer case 32, and is structured such that the noise reduction inner case 31 is arranged within the noise reduction outer case 32, the noise reduction material 39 is filled between the noise reduction inner case 31 and the noise reduction outer case 32, and a lot of noise reduction holes 37 are formed in the noise reduction inner case 31, the silencer casing (the noise reduction inner case 31 and the noise reduction outer case 32) can be constructed so as to be similar to the exhaust gas purifying structure provided with the catalyst inner case 4 or the filter inner case 20 which is internally provided with the diesel oxidation catalyst 2 or the soot filter 3, and the catalyst outer case 5 or the filter outer case 21.

The noise reduction inner case 31 and the noise reduction outer case 32 of the silencer casing can be formed by utilizing the same material (the pipe or the like) as that of the catalyst inner case 4 or the filter inner case 20 for being internally provided with the diesel oxidation catalyst 2 or the soot filter 3, and the catalyst outer case 5 or the filter outer case 21. It is possible to easily reduce a manufacturing cost of the silencer casing.

Figure 10:
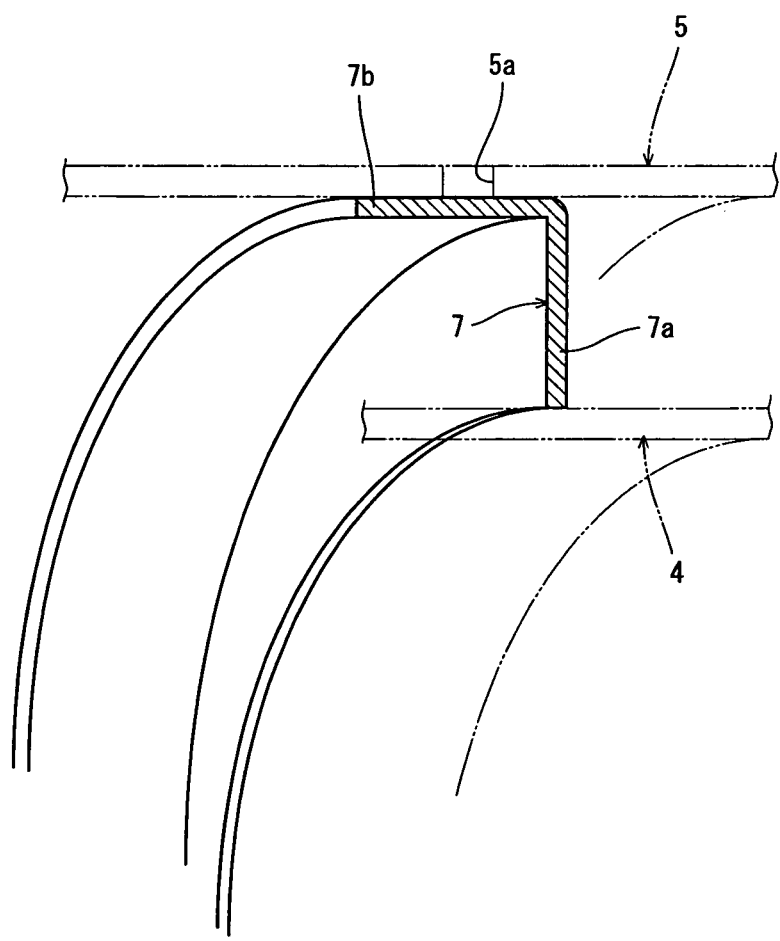
FIG. 10 is an enlarged cross sectional view of an inner case support body.

A description will be given of the structure of the inner case support body 7 with reference to FIGS. 1 and 5 and FIGS. 10 to 14. As shown in FIGS. 1, 5, and 10, the structure is made such that the cylindrical catalyst outer case 5 is fitted to the outer side of the cylindrical catalyst inner case 4 via a ring shaped inner case support body 7 having an I-shaped form in an end face and made of a thin plate, and a stress (a deforming force) of the catalyst outer case 5 is reduced by the thin plate inner case support body 7. As shown in FIG. 10, the inner case support body 7 has an I-shaped thin plate portion 7a, and an outer case connection portion 7b. An inner diameter side end edge of the I-shaped thin plate portion 7a is welded to an outer surface in the exhaust gas movement downstream side of the catalyst inner case 4. In other words, the I-shaped thin plate portion 7a is raised approximately vertical to the outer surface of the catalyst inner case 4, and the I-shaped thin plate portion 7a is protruded in a radial direction from the outer surface of the catalyst inner case 4. The outer case connection portion 7b is extended in a direction of being bent approximately at a right angle from an outer diameter side end edge of the I-shaped thin plate portion 7a. A cross sectional end face of the inner case support body 7 is formed as an L-shaped form by the I-shaped thin plate portion 7a, and the outer case connection portion 7b.

Further, the end portion of the outer case connection portion 7b is extended in the exhaust gas moving direction (the direction of the center line of the cylindrical case 5) along the inner surface of the catalyst outer case 5. The outer case connection portion 7b is welded to an inner surface of an intermediate portion in the exhaust gas moving direction of the catalyst outer case 5 via a welding process hole 5a perforated in the catalyst outer case 5. In this case, the welding process hole 5a is closed by the welding process of the outer case connection portion 7b. In other words, as shown in FIGS. 1 and 10, in the exhaust gas purifying device provided with the diesel oxidation catalyst 2 or the soot filter 3 which serves as the gas purifying filter purifying the exhaust gas which the diesel engine 70 discharges, the catalyst inner case 4 or the filter inner case 20 which serves as the inner case internally provided with the diesel oxidation catalyst 2 or the soot filter 3, and the catalyst outer case 5 or the filter outer case 21 which serves as the outer case internally provided with the catalyst inner case 4 or the filter inner case 20, the structure is made such that the ring shaped inner case support body 7 is provided between the catalyst inner case 4 and the catalyst outer case 5, the inner case support body 7 is formed by the flexible material having the vibration damping function, and the catalyst inner case 4 is supported to the catalyst outer case 5 via the inner case support body 7.

As a result, the vibration of the catalyst outer case 5 is damped by the inner case support body 7, it is possible to reduce the vibration transmitted from the catalyst outer case 5 to the catalyst inner case 4, and it is possible to easily prevent a sealing performance of the diesel oxidation catalyst 2 from being reduced, and prevent the catalyst outer case 5, the catalyst inner case 4 or the diesel oxidation catalyst 2 from being damaged or falling away. In other words, it is possible to reduce the reduction of the sealing performance of the catalyst outer case 5 or the catalyst inner case 4, and it is possible to improve a durability of the diesel oxidation catalyst 2.

Further, it is possible to easily improve a maintenance workability of the soot filter 3 even in the filter structure in which the purifying capacity of the exhaust gas is enhanced, for example, by combining a plurality of diesel oxidation catalysts 2 or soot filters 3. Further, it is possible to control a temperature of the catalyst inner case 4 (the diesel oxidation catalyst 2) on the basis of a heat insulating action of the space between the catalyst inner case 4 and the catalyst outer case 5. It is possible to maintain the temperature of the diesel oxidation catalyst 2 at a catalyst appropriate temperature (from about 300 degree to about 500 degree).

As shown in FIGS. 1, 5, and 10, since the inner case support body 7 is formed by the thin plate having the I-shaped cross sectional end face, and is structured such that one end side of the inner case support body 7 is extended in a direction extending along the inner surface of the catalyst outer case 5, the outer case connection portion 7b welded to the catalyst outer case 5 is formed in the extension portion in the one end side of the inner case support body 7, and the outer case connection portion 7b is firmly fixed to the inner surface of the catalyst outer case 5, it is possible to weld the outer case connection portion 7b to the catalyst outer case 5 from the outer side of the catalyst outer case 5 by inserting the catalyst inner case 4 into the catalyst outer case 5 in a state in which the other end side of the inner case support body 7 is welded to the outer face of the catalyst inner case 4. The inner case support body 7 can be formed by the thin plate having a thickness which is not limited by the welding work. It is possible to improve an assembling workability of the catalyst outer case 5 and the catalyst inner case 4.

As shown in FIGS. 1, 5, and 10, since it is provided with a plurality of diesel oxidation catalyst 2 or soot filters 3, the catalyst inner case 4 or the filter inner case 20, and the catalyst outer case 5 or the filter outer case 21, is structured such that the catalyst side flange 25 or the filter side flange 26 which serves as the flange body connecting the catalyst outer case 5 or the filter outer case 21 is offset with respect to the connection position of a plurality of diesel oxidation catalysts 2 or soot filters 3, and is structured such that the catalyst outer case 5 which is opposed to the other diesel oxidation catalyst 2 laps over the filter inner case 20 which is opposed to one soot filter 3, it is possible to shorten the length in the exhaust gas moving direction of a plurality of catalyst outer cases 5 or filter outer cases 21 while securing an installation length in the exhaust gas moving direction of a plurality of diesel oxidation catalysts 2 or soot filters 3, and it is possible to achieve an improvement of a rigidity of a plurality of catalyst outer cases 5 or filter outer cases 21 and a weight saving thereof.

Further, the filter inner case 20 over which the catalyst outer case 5 laps (the soot filter 3 in the exhaust gas movement downstream side) can be largely exposed to the outer portion on the basis of a separation (a disassemble) of the catalyst outer case 5 or the filter outer case 21. In other words, an exposure range of the exhaust gas movement upstream side end portion of the soot filter 3 arranged in the gas movement downstream side (the filter inner case 20 in the exhaust gas movement downstream side) in a plurality of diesel oxidation catalysts 2 or soot filters 3 is increased, and it is possible to easily execute a maintenance work such as a removal of the soot of the soot filter 3 in the exhaust gas movement downstream side or the like. It is possible to improve a maintenance work such as a cleaning of the soot filter 3 which is executed by separating the catalyst outer case 5 or the filter outer case 21 (the catalyst inner case 4 or the filter inner case 20) in the connection portion of the catalyst side flange 25 or the filter side flange 26.

Figure 11:
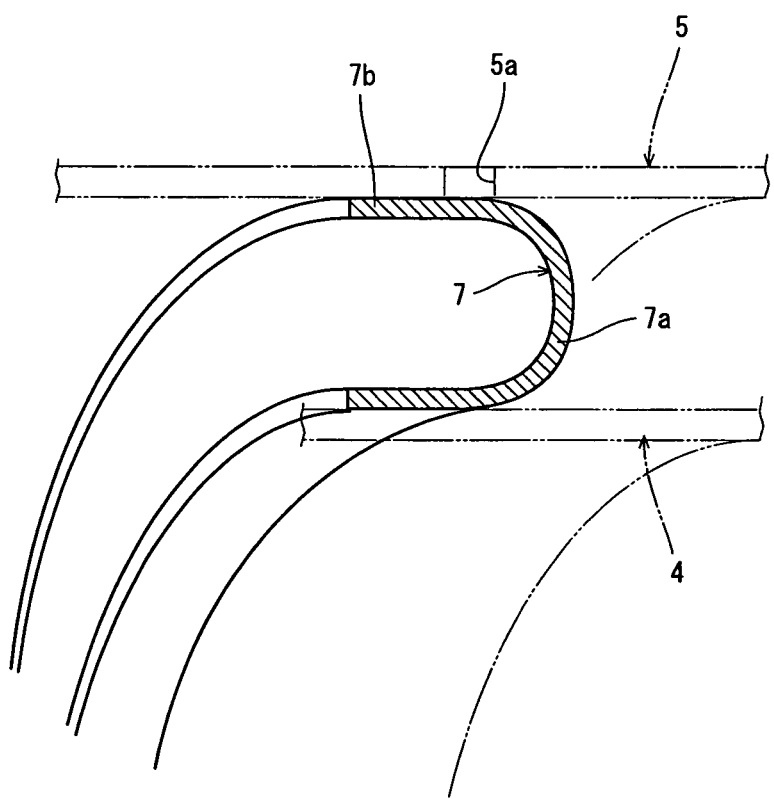
FIG. 11 is an enlarged cross sectional view of the inner case support and shows a modified embodiment of FIG. 10.
Figure 12:
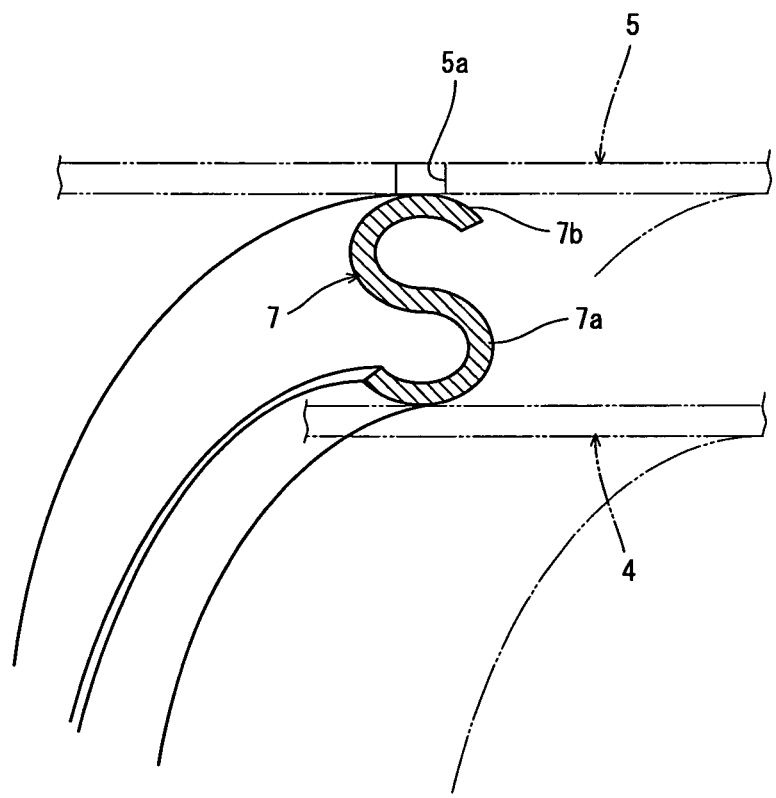
FIG. 12 is an enlarged cross sectional view of the inner case support and shows a modified embodiment of FIG. 10.
Figure 13:
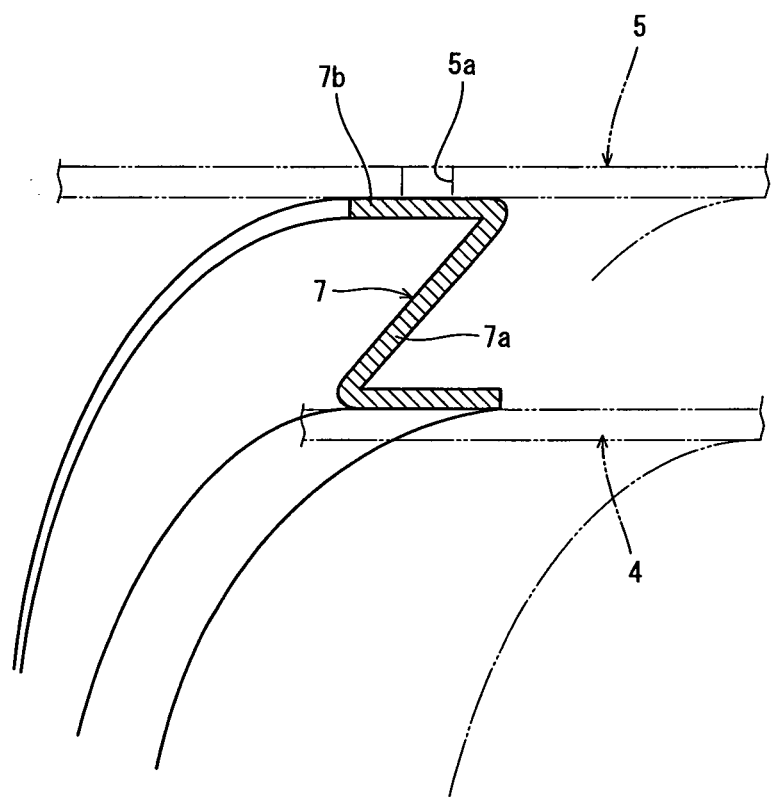
FIG. 13 is an enlarged cross sectional view of the inner case support and shows a modified embodiment of FIG. 10.
Figure 14:
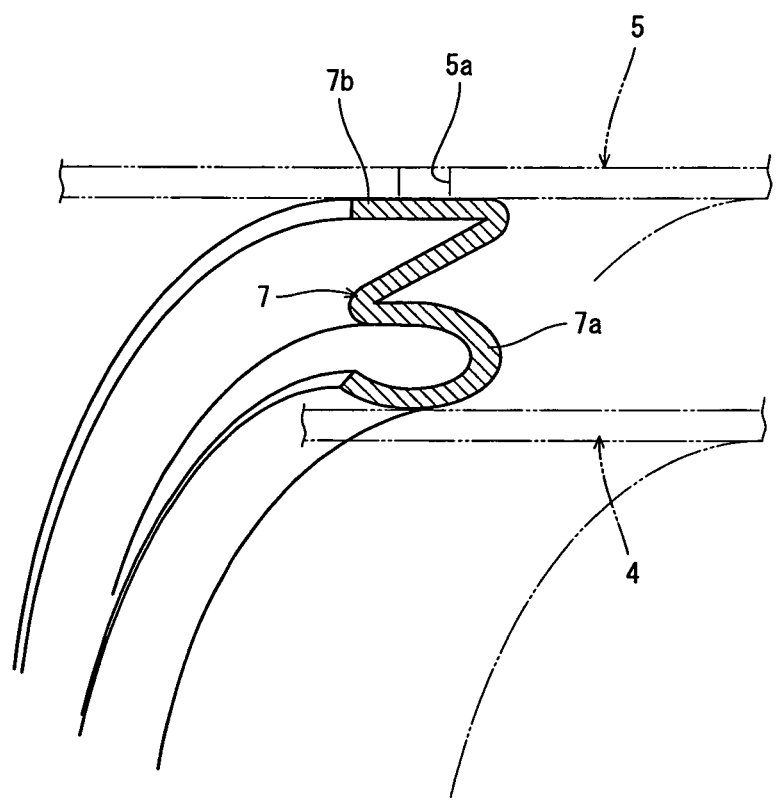
FIG. 14 is an enlarged cross sectional view of the inner case support and shows a modified embodiment of FIG. 10.

FIGS. 11 to 14 show a modified structure of the inner case support body 7 which is disclosed in FIG. 10. In the embodiment mentioned above, the inner case support body 7 is formed by the ring shaped thin plate having the I-shaped end face, however, the inner case support body 7 may be formed by a ring shaped thin plate having a U-shaped end face, as shown in FIG. 11. Further, as shown in FIG. 12, the inner case support body 7 may be formed by a ring shaped thin plate having an S-shaped end face. As shown in FIG. 13, the inner case support body 7 may be formed by a ring shaped thin plate having a Z-shaped end face. As shown in FIG. 14, the inner case support body 7 may be formed by a ring shaped thin plate having a compound end face obtained by combining the Z-shaped form and the S-shaped form.

As shown in FIGS. 10 to 13, since the inner case support body 7 is formed by any one of the thin plate having the I-shaped cross sectional end face (refer to FIG. 10), the thin plate having the U-shaped cross sectional end face (refer to FIG. 11), the thin plate having the S-shaped cross sectional end face (refer to FIG. 12), and the thin plate having the Z-shaped cross sectional end face (refer to FIG. 13), and is structured such that the catalyst inner case 4 is elastically supported to the catalyst outer case 5 via the inner case support body 7, it is possible to support the outer face side of the exhaust gas movement downstream side end portion of the catalyst inner case 4 with a high rigidity, even in the filter structure in which the purifying capacity of the exhaust gas is enhanced, for example, by setting the plural sets of catalyst outer cases 5 or filter outer cases 21 and the catalyst inner cases 4 or the filter inner cases 20, and combining a plurality of diesel oxidation catalysts 2 or soot filters 3. It is possible to easily improve a maintenance workability of the exhaust gas movement upstream side end portion of the soot filter 3 which is arranged in the exhaust gas movement downstream side.

Further, it is possible to easily prevent the sealing performance of the diesel oxidation catalyst 2 or the soot filter 3 from being lowered, and prevent the catalyst outer case 5 or the filter outer case 21 or the catalyst inner case 4 or the filter inner case 20 or the diesel oxidation catalyst 2 or the soot filter 3 from being damaged or falling away.

As shown in FIG. 14, since the inner case support body is formed by the thin plate having the I-shaped cross sectional end face (refer to FIG. 10), the thin plate having the U-shaped cross sectional end face (refer to FIG. 11), the thin plate having the S-shaped cross sectional end face (refer to FIG. 12), the thin plate having the Z-shaped cross sectional end face (refer to FIG. 13) or the thin plate having the compound shape obtained by combining two or more of them (refer to FIG. 14), and the catalyst inner case 4 is structured such as to be elastically supported to the catalyst outer case 5 via the inner case support body 7, it is possible to support the outer face side of the exhaust gas movement downstream side end portion of the catalyst inner case 4 with a high rigidity to the inner face side in the middle in the exhaust gas moving direction of the catalyst outer case 5 via the inner case support body 7, even in the filter structure in which the purifying capacity of the exhaust gas is enhanced, by setting the plural sets of catalyst outer cases 5 or filter outer cases 21 and the catalyst inner cases 4 or the filter inner cases 20, and combining a plurality of diesel oxidation catalysts 2 or soot filters 3. It is possible to easily improve a maintenance workability of the exhaust gas movement upstream side end portion of the soot filter 3 which is arranged in the exhaust gas movement downstream side.

Further, it is possible to easily prevent the sealing performance of the diesel oxidation catalyst 2 or the soot filter 3 from being lowered, and prevent the catalyst outer case 5 or the filter outer case 21 or the catalyst inner case 4 or the filter inner case 20 or the diesel oxidation catalyst 2 or the soot filter 3 from being damaged or falling away.

A description will be given of a structure in which the DPF 1 is provided in the diesel engine 70 with reference to FIGS. 15 to 18 and FIG. 23. As shown in FIGS. 15 to 18, the exhaust gas manifold 71 and an intake manifold 73 are arranged in left and right surfaces of the cylinder head 72 of the diesel engine 70. The cylinder head 72 is mounted on a cylinder block 75 having an engine output shaft 74 (a crank shaft) and a piston (not shown). A front end and a rear end of the engine output shaft 74 are protruded from a front face and a rear face of the cylinder block 75. A cooling fan 76 is provided in a front face of the cylinder block 75. The structure is made such that a turning force is transmitted from a front end side of the engine output shaft 74 to the cooling fan 76 via a V belt 77.

Figure 15:
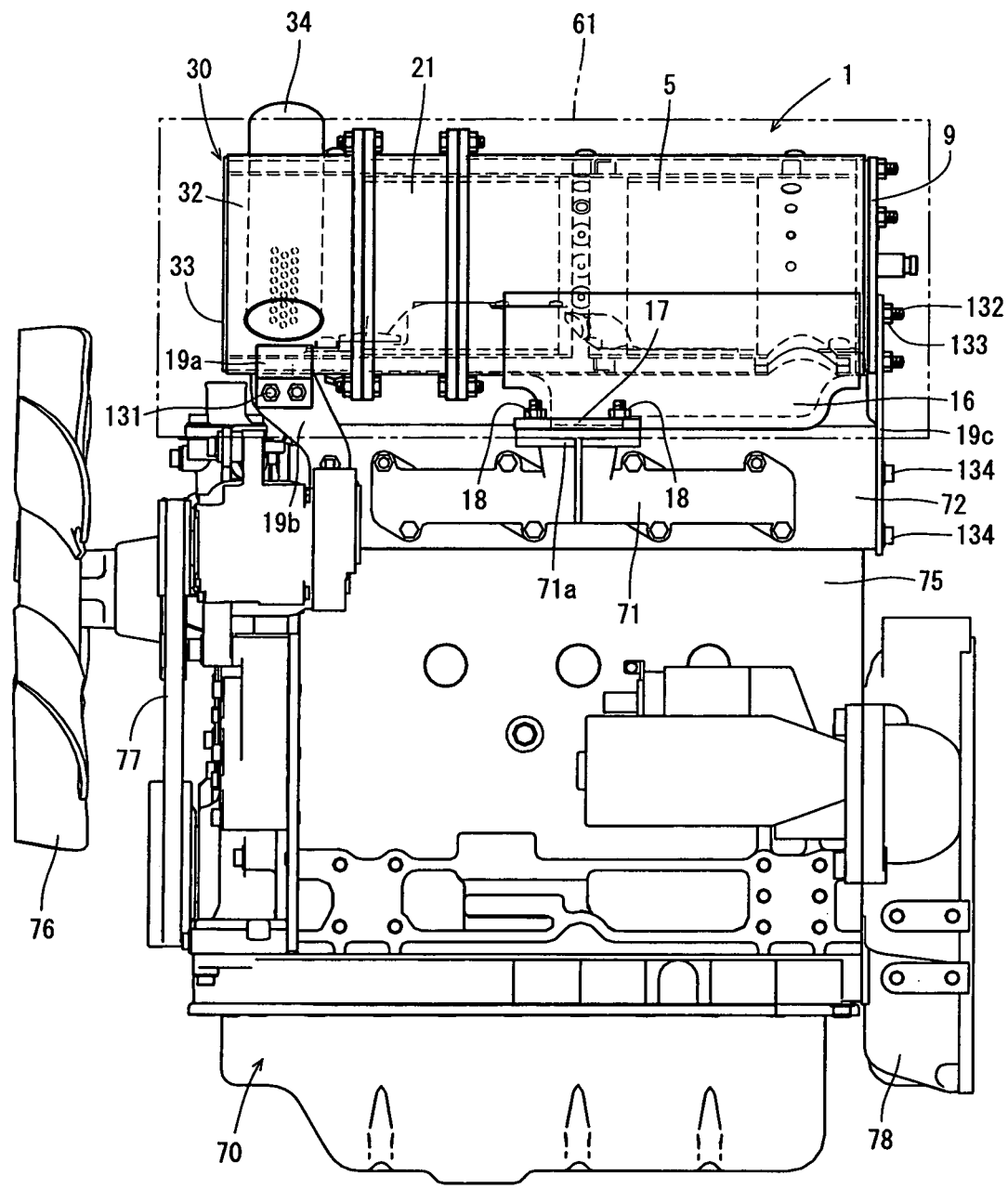
FIG. 15 is a left side elevational view of a diesel engine.
Figure 16:
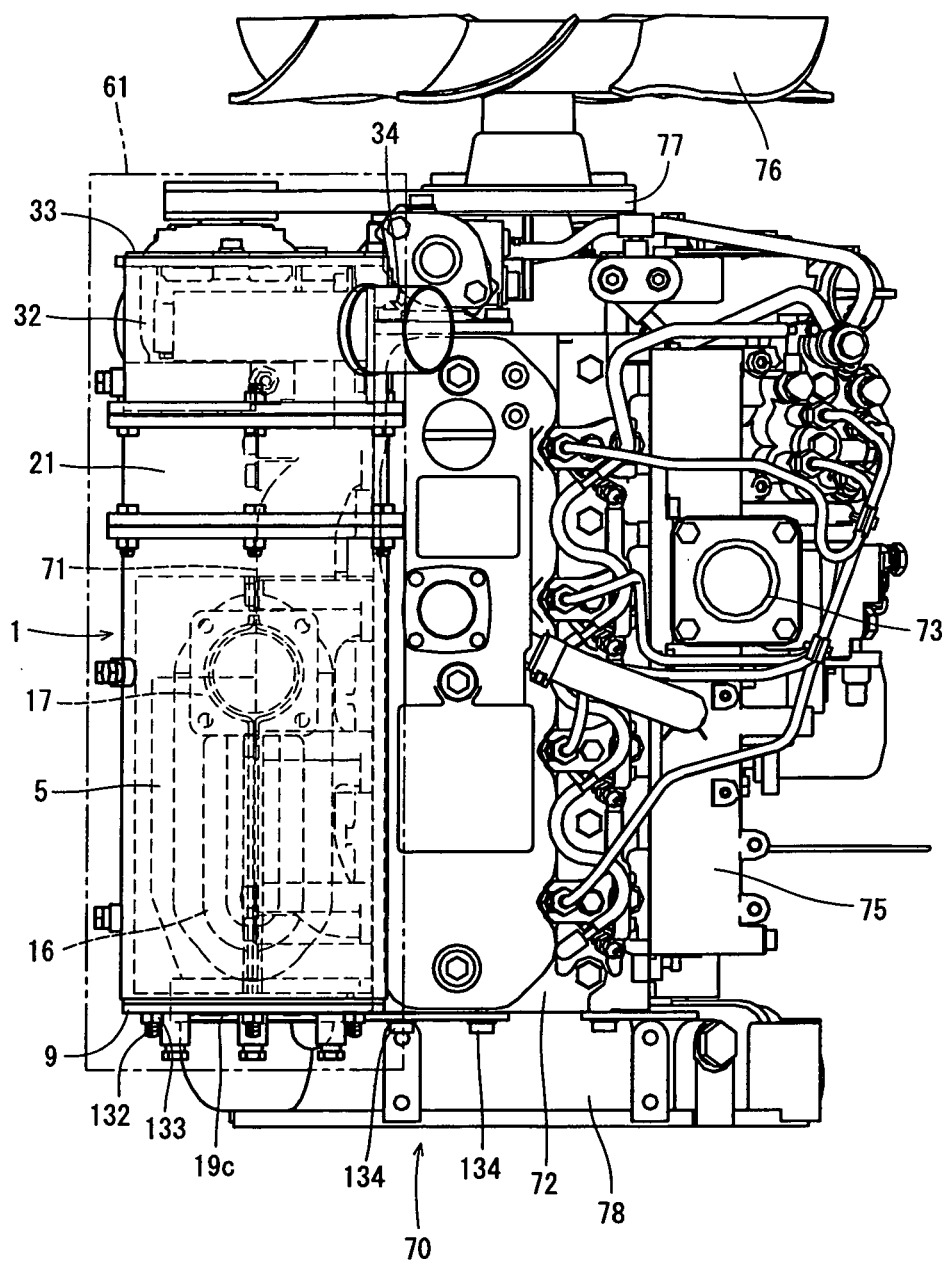
FIG. 16 is a plan view of the diesel engine.
Figure 18:
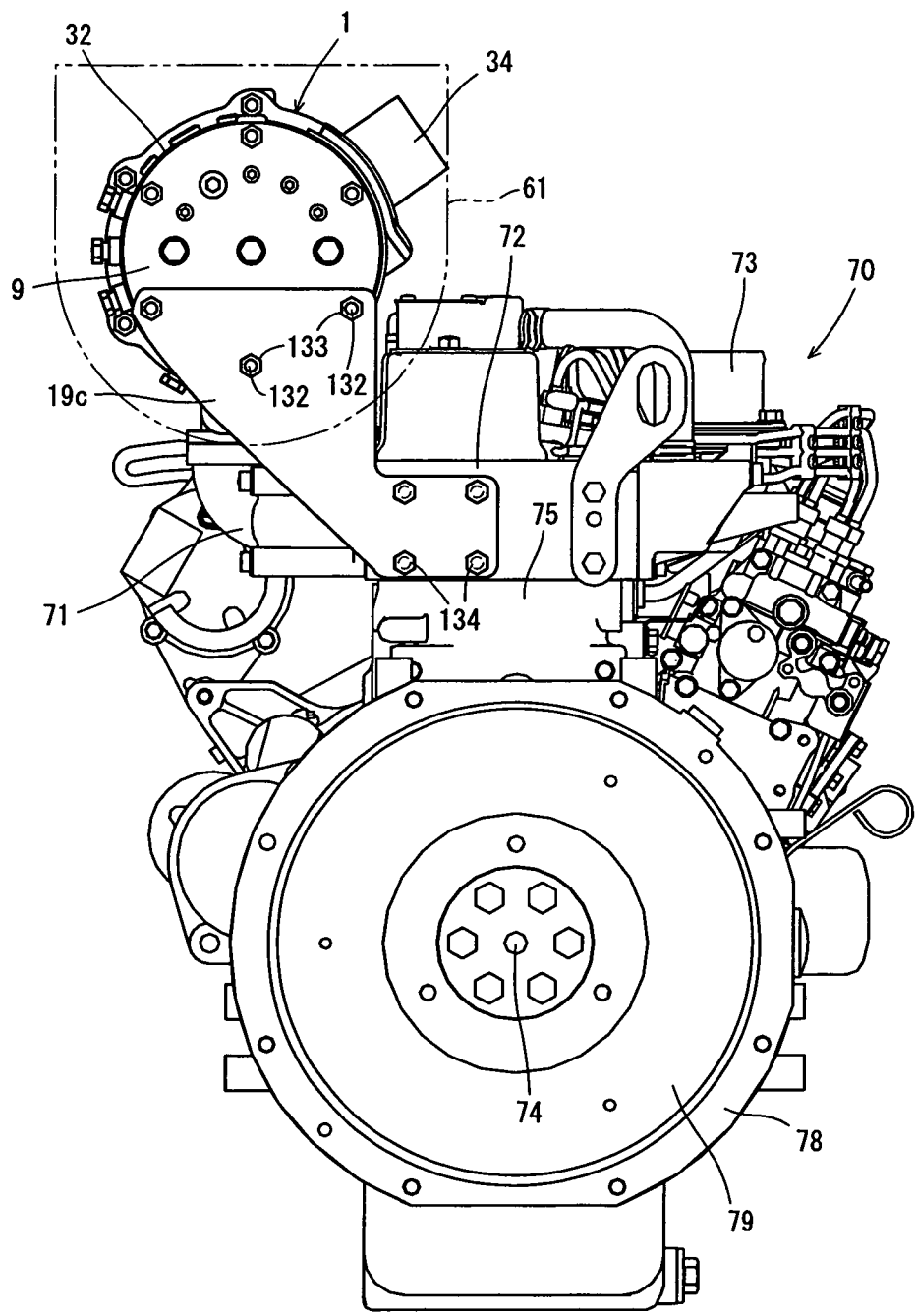
FIG. 18 is a back elevational view of the diesel engine.

As shown in FIGS. 15, 16, and 18, a flywheel housing 78 is firmly fixed to a rear face of the cylinder block 75. A flywheel 79 is provided within the flywheel housing 78. The flywheel 79 is pivoted to a rear end side of the engine output shaft 74. The structure is made such that a power of the diesel engine 70 is taken out to an operation portion such as a back hoe 100, a fork lift 120 or the like mentioned below via the flywheel 79.

Figure 17:
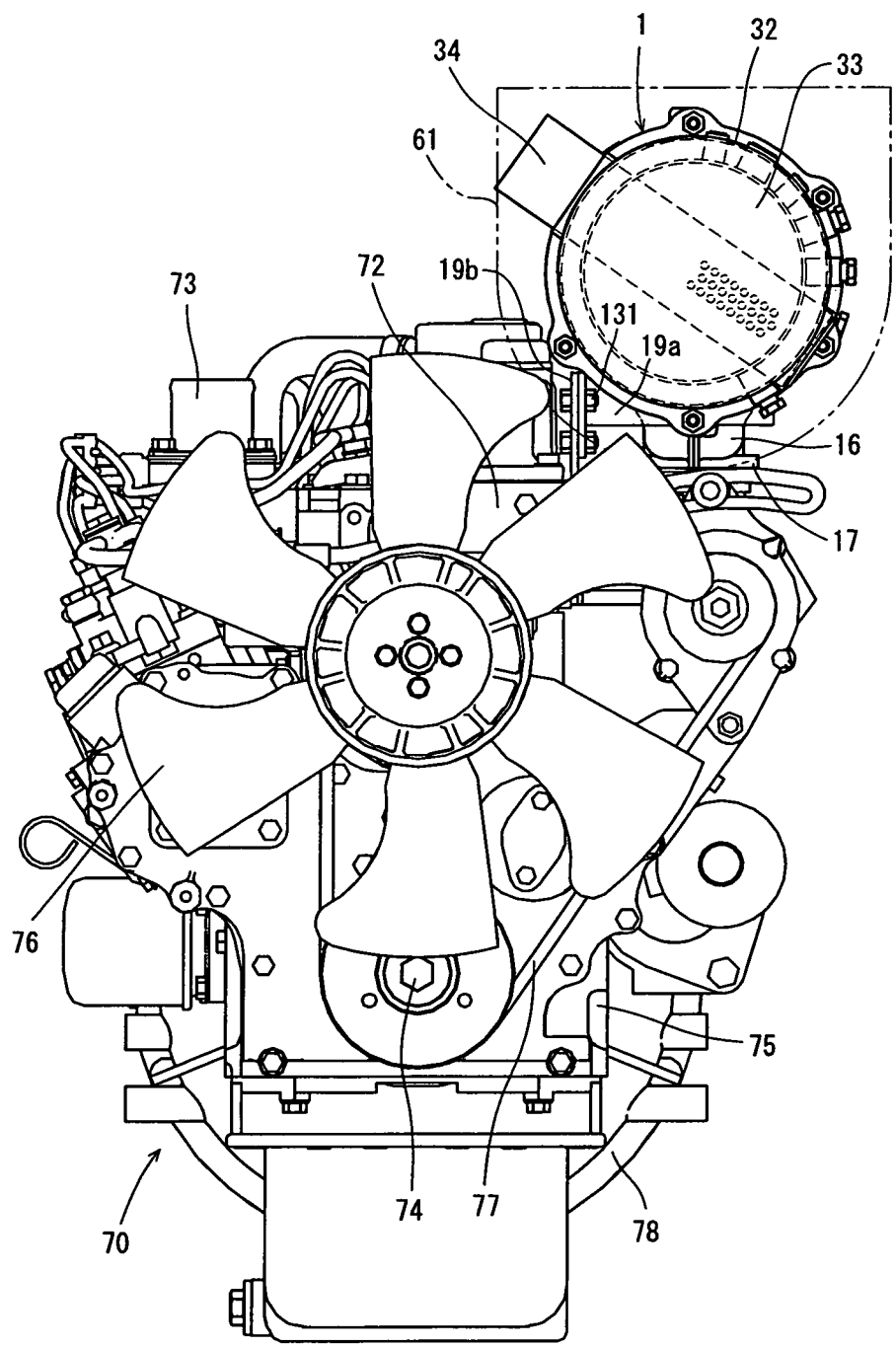
FIG. 17 is a front elevational view of the diesel engine.

As shown in FIGS. 15, 17, and 18, one end side of the first support leg body 19a is fixed by welding to the noise reduction outer case 32. The other end side of the first support leg body 19a firmly fixed to the noise reduction outer case 32 is detachably fastened to an upper end side of the second support leg body 19b attached to a position close to the cooling fan 76 in the cylinder head 72 by a bolt 131. One end side (an upper end side) of the third support leg body 19c is detachably fastened to a side end surface close to the exhaust gas inflow port 12 in the catalyst outer case 5 by a bolt 132 and a nut 133. The other end side (a lower end side) of the third support leg body 19c is detachably fastened to a side end surface close to the flywheel housing 78 in the cylinder head 72 by a bolt 134. The support leg bodies 19a to 19c correspond to a filter support body supporting the DPF 1.

A connection portion 71a to the exhaust gas connection flange body 17 in the exhaust gas manifold 71 is provided so as to protrude upward from approximately the center portion of the exhaust gas manifold 71. The exhaust gas connection flange body 17 of the exhaust gas inlet pipe 16 is detachably fastened to the connection portion 71a of the exhaust gas manifold 71 via the bolt 18.

As shown in FIGS. 15 to 18, the DPF 1 in accordance with the embodiment is formed long along the engine output shaft 74, and is arranged so as to come close to a position near the exhaust gas manifold 71 on the cylinder head 72. Accordingly, the intake manifold 73 side in the cylinder head 72 is exposed outward, and comes to a state in which a maintenance work is easily carried out. Further, the exhaust gas inflow port 12 and the exhaust gas outlet pipe 34 (the exhaust gas outflow port) are arranged in one end side in the longitudinal direction in the DPF 1 and the other end side in the longitudinal direction so as to be divided right and left.

Further, a DPF hood 61 (refer to a two-dot chain line in FIGS. 15 to 18) is provided in an outer peripheral side of the DPF 1 so as to intercept in such a manner as to prevent the wind from the cooling fan 76 from directly hitting against the DPF 1. On the basis of an existence of the DPF hood 61, it is possible to inhibit the temperature of the DPF 1 and further of the exhaust gas in the inner portion of the DPF 1 from being lowered by the wind from the cooling fan 76, thereby intending to maintain the exhaust gas temperature.

As is apparent from the structure mentioned above, the DPF 1 in accordance with the embodiment is connected to the exhaust gas manifold 71 of the engine 70, and is connected to the cylinder head 72 via a plurality of filter support bodies (the support leg bodies 19a to 19c). Accordingly, there can be obtained such an effect that the DPF 1 can be arranged with a high rigidity in the diesel engine 70, as one of the constructing parts of the diesel engine 70, an exhaust gas countermeasure per equipment of the working vehicle or the like is not necessary, and it is possible to improve a general purpose property of the diesel engine 70.

In other words, it is possible to support the DPF 1 with a high rigidity by utilizing the cylinder head 72 corresponding to the high rigidity part of the diesel engine 70, and it is possible to prevent the DPF 1 from being damaged due to a vibration or the like. Further, there are such advantages that it is possible to incorporate the DPF 1 into the diesel engine 70 at a manufacturing place of the diesel engine 70 so as to ship, and it is possible to arrange the diesel engine 70 and the DPF 1 so as to construct compactly.

Particularly, in the embodiment, the one end side in the longitudinal direction of the DPF 1 is connected to the cylinder head 72 via the first and second support leg bodies 19a and 19b, and the other end side in the longitudinal direction of the DPF 1 is connected to the cylinder head 72 via the third support leg body 19c. Further, an intermediate portion in the longitudinal direction of the DPF 1 is connected to the exhaust gas manifold 71. Accordingly, the DPF 1 can be connected with a high rigidity onto the diesel engine 70 on the basis of a three point support using the exhaust gas manifold 71 and the support leg bodies 19a to 19c, thereby being effective for preventing the DPF 1 from being damaged by the vibration or the like.

Since the DPF 1 in accordance with the embodiment is formed long along the engine output shaft 74, and is arranged close to the position near the exhaust gas manifold 71 on the cylinder head 72, it is possible to make the intake manifold 73 side having a lot of small parts in the cylinder head 72 expose, and a maintenance work in connection to the diesel engine 70 is easily carried out. Further, it is possible to communicate the DPF 1 within the exhaust gas manifold 71 at the shortest distance, and it is possible to suppress the reduction of the exhaust gas temperature passing within the DPF 1 as much as possible. Accordingly, the exhaust gas purifying performance of the DPF 1 can be maintained in a high state.

Further, since the exhaust gas inflow port 12 and the exhaust gas outlet pipe 34 (the exhaust gas outflow port) are arranged in the one end side in the longitudinal direction in the DPF 1 and the other end side in the longitudinal direction so as to be divided right and left, it is possible to support the DPF 1 in a state of making close to the upper surface of the cylinder head 72. Accordingly, it is possible to achieve a high effect for preventing the DPF 1 from being damaged due to the vibration or the like, by utilizing the rigidity of the cylinder head 72.

A description will be given of an aspect for changing the attaching direction of the DPF 1 with reference to FIG. 23. As mentioned above, the positional relationship of the insertion holes of the exhaust gas connection flange body 17 and the exhaust gas manifold 71 is set in such a manner that the exhaust gas connection flange body 17 can be fastened to the exhaust gas manifold 71 by the bolt 18, even in the state in which the lateral attaching directions are inverted (the laterally inverted state), in the DPF 1 in accordance with the embodiment. In other words, the downward open end portion 16a of the exhaust gas inlet pipe 16 is connected to the exhaust gas manifold 71 in such a manner that the attaching direction can be changed.

Figure 23:
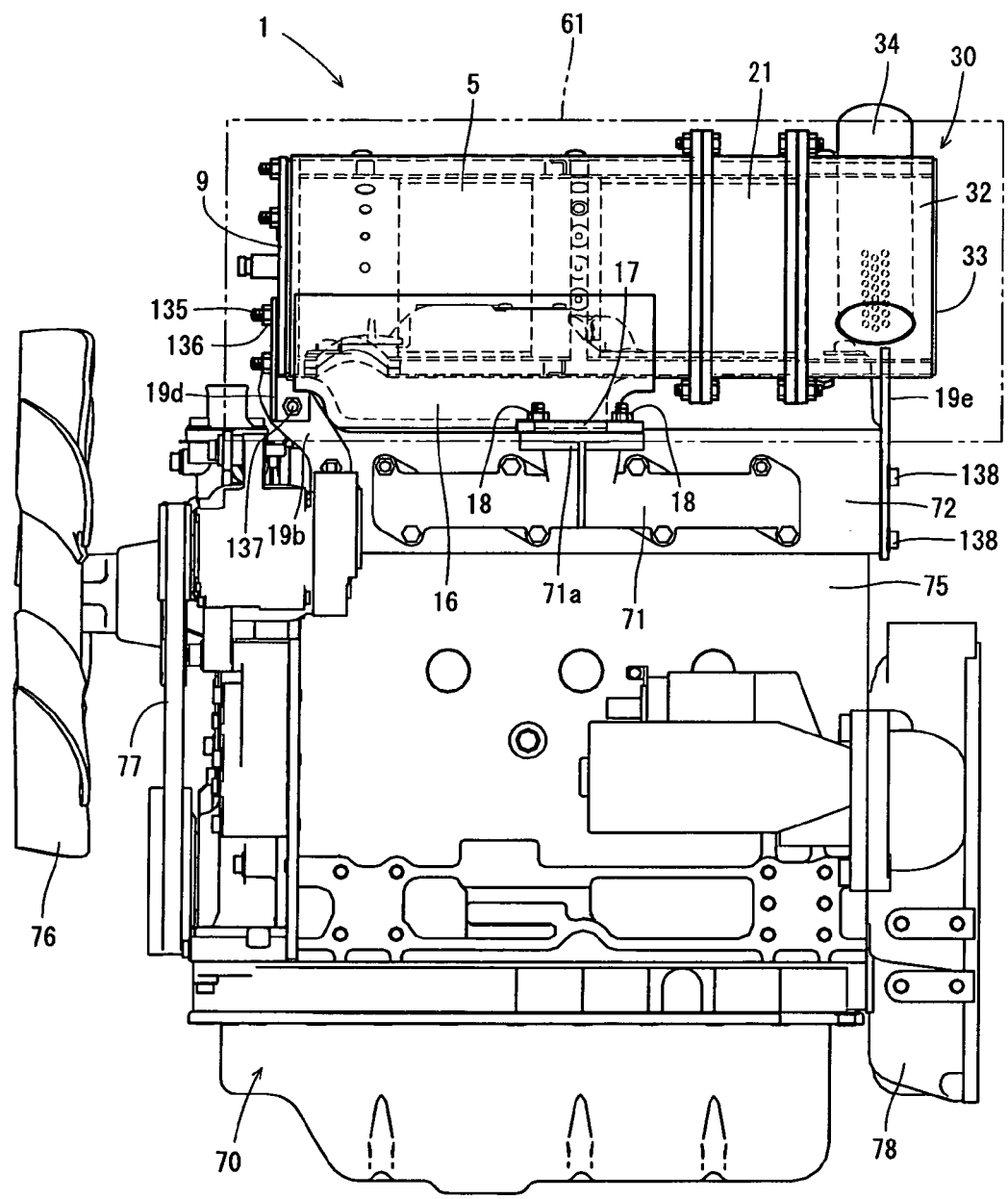
FIG. 23 is a left side elevational view in the case that an attaching direction of the exhaust gas purifying device is inverted at 180 degree from a state in FIG. 15.

FIG. 23 shows an example in which the attaching direction of the DPF 1 to the exhaust gas manifold 71 is inverted at 180 degree from the state in FIG. 15. In this case, one end side (an upper end side) of a fourth support leg body 19d is detachably fastened to the side end surface close to the exhaust gas inflow port 12 in the catalyst outer case 5 by a bolt 135 and a nut 136. The other end side (a lower end side) of the fourth support leg body 19d is detachably fastened to an upper end side of the second support leg body 19b attached to the position close to the cooling fan 76 in the cylinder head 72 by a bolt 137.

One end side of a fifth support leg body 19e is fixed by welding to the noise reduction outer case 32. The other end side of the fifth support leg body 19e is detachably fastened to a side end surface close to the flywheel housing 78 in the cylinder head 72 by a bolt 138. The fourth and fifth support leg bodies 19*d* and 19*e* correspond to the filter support body supporting the DPF 1.

In this case, taking into consideration a height relationship of the cylinder head 72, the exhaust gas manifold 71 and the DPF 1, in addition that the DPF 1 is inverted right and left (inverted at 180 degree), it can be structured such that the attaching direction is changed and modulated over 360 degree in a horizontal direction around the connection portion 71*a* of the exhaust gas manifold 71.

As is apparent from the structure mentioned above, since the DPF 1 in accordance with the embodiment is provided with the exhaust gas inlet pipe 16 having the downward open end portion 16*a* (the exhaust gas inlet side) in the midstream portion in the longitudinal direction of the catalyst outer case 5, and the exhaust gas inflow port 12 is provided in the one end side in the longitudinal direction of the catalyst outer case 5, it is possible to form the gas purifying filter (the diesel oxidation catalyst 2 and the soot filter 3) long and to set the distribution distance of the exhaust gas within the catalyst outer case 5 long, by effectively utilizing the length in the longitudinal direction of the catalyst outer case 5, thereby achieving an improvement of the exhaust gas purifying performance in the DPF 1. In addition, since the exhaust gas inlet pipe 16 is arranged in the midstream portion in the longitudinal direction of the catalyst outer case 5, and the upward open end portion 16*b* (the exhaust gas outlet) of the exhaust gas inlet pipe 16 is structured such as to be connected to the exhaust gas inflow port 12, there can be obtained such an effect that the DPF 1 can be stably supported by the exhaust gas inlet pipe 16 in the midstream portion in the longitudinal direction of the catalyst outer case 5, while achieving an improvement of the exhaust gas purifying performance.

Further, since the downward open end portion 16*a* (the exhaust gas inlet side) of the exhaust gas inlet pipe 16 is connected to the exhaust gas manifold 71 of the diesel engine 70 in such a manner that the attaching direction can be changed, it is possible to select and change the direction of the exhaust gas outflow port (the exhaust gas outlet pipe 34) from the catalyst outer case 5, without changing the structure of the catalyst outer case 5. Particularly, in the embodiment, the downward open end portion 16*a* of the exhaust gas inlet pipe 16 is positioned in the center portion in the longitudinal direction of the catalyst outer case 5, and the catalyst outer case 5 is positioned between the cooling fan 76 in the one side of the diesel engine 70 and the flywheel housing 78 in the other side, whereby the structure of one kind DPF 1 can cope with the specification in which the exhaust gas outlet pipe 34 of the DPF 1 is arranged in the cooling fan 76 side, and the specification in which the exhaust gas outlet pipe 34 of the DPF 1 is arranged in the flywheel housing 78 side.

Accordingly, since the structure of the DPF 1 itself does not change, there is no risk that the tendency of the exhaust gas emission (the particulate matter, the NOx or the like) in the exhaust gas passing through the DPF 1 changes, so that there can be obtained such an effect that it is possible to omit a labor hour or the like for testing and checking or shipping and demanding per the working machine mounting the diesel engine 70 thereon, and it is possible to suppress the manufacturing cost.

In addition, since the exhaust gas inlet pipe 16 is attached to the catalyst outer case 5 in such a manner as to cover the exhaust gas inflow port 12 and extend in the longitudinal direction of the catalyst outer case 5, the exhaust gas inlet pipe 16 itself functions as the reinforcing member with respect to the catalyst outer case 5. Accordingly, it is possible to achieve a weight saving as well as it is possible to improve a rigidity of the catalyst outer case 5, without the provision of the dedicated reinforcing member. Further, since the number of the constructing parts can be reduced in comparison with the structure provided with the dedicated reinforcing member, it is possible to construct at a low cost.

Further, since the conduction passage 61 of the exhaust gas is constructed by the outer surface of the catalyst outer case 5 and the inner surface of the exhaust gas inlet pipe 16, it is possible to warm up the catalyst outer case 5 by the exhaust gas within the exhaust gas inlet pipe 16 (within the conduction passage 61), and it is possible to suppress the reduction of the temperature of the exhaust gas passing through the DPF 1. Accordingly, it also contributes to an improvement of the exhaust gas purifying performance of the DPF 1, in this regard.

Figure 19:
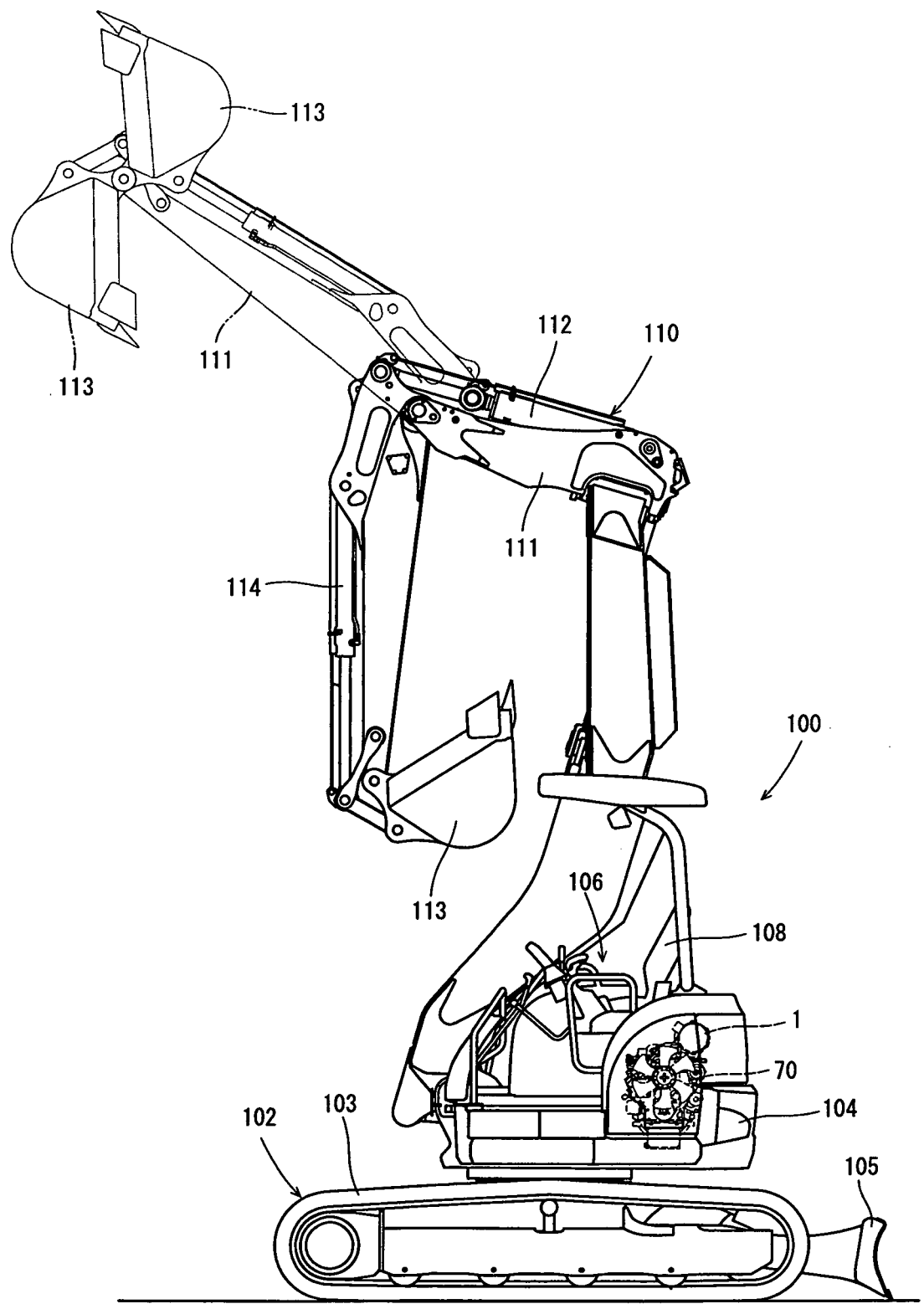
FIG. 19 is a side elevational view of a back hoe.
Figure 20:
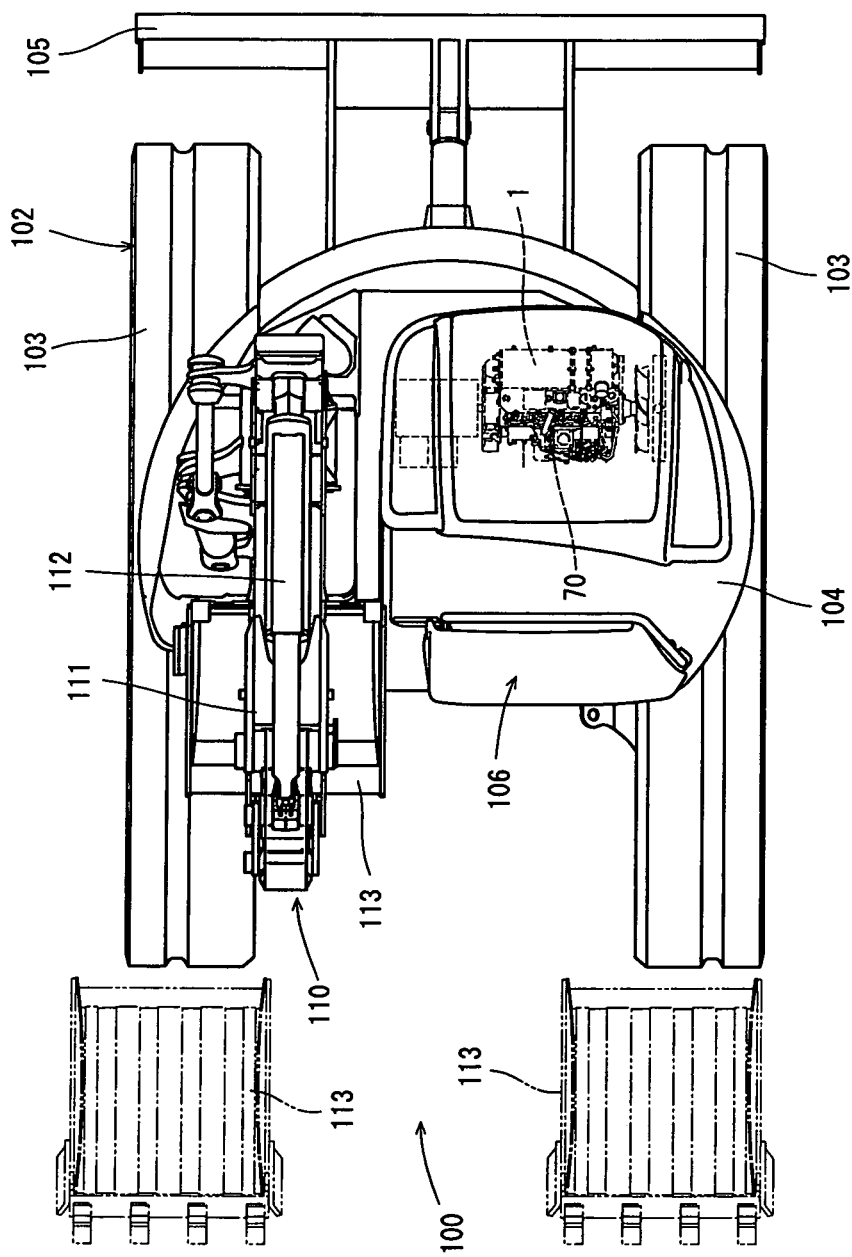
FIG. 20 is a plan view of the back hoe.

A description will be given of a structure in which the diesel engine 70 is mounted to the back hoe 100 with reference to FIGS. 19 and 20. As shown in FIGS. 19 and 20, the back hoe 100 is provided with a crawler type traveling apparatus 102 having a pair of right and left traveling crawlers 103, and a swing machine body 104 provided on the traveling apparatus 102. The swing machine body 104 is structured such as to be horizontally swing over all directions of 360 degree, by a swinging hydraulic motor (not shown). A bulldozing blade 105 for a ground work is installed in a rear portion of the traveling apparatus 102 so as to be movable up and down. A control portion 106 and the diesel engine 70 are mounted to a left portion of the swing machine body 104. A working portion 110 having a boom 111 and a bucket 113 for an excavating work is provided in a right portion of the swing machine body 104.

In the control portion 106, there are arranged a control seat 108 on which an operator seats, an operation means for operating an output of the diesel engine 70 or the like, and a lever or a switch serving as an operation means for the working portion 110. A boom cylinder 112 and a bucket cylinder 114 are arranged in the boom 111 corresponding to a constructing element of the working portion 110. The bucket 113 serving as an excavating attachment is pivoted to a leading end portion of the boom 111 so as to be rotatable while scooping. The structure is made such that an earth work (a ground work such as a groove formation or the like) is executed with the bucket 113 by actuating the boom cylinder 112 or the bucket cylinder 114.

Figure 21:
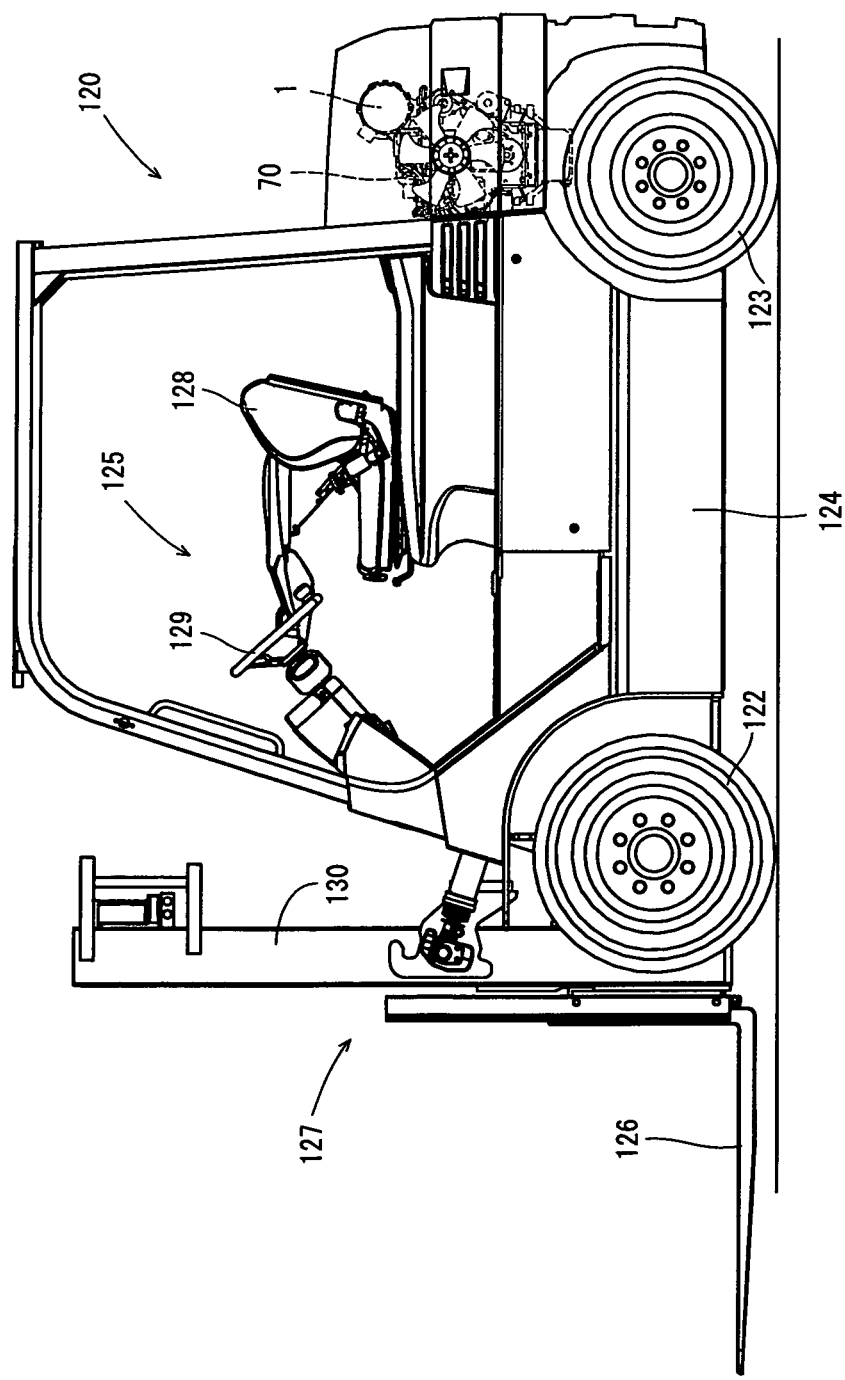
FIG. 21 is a side elevational view of a fork lift car.
Figure 22:
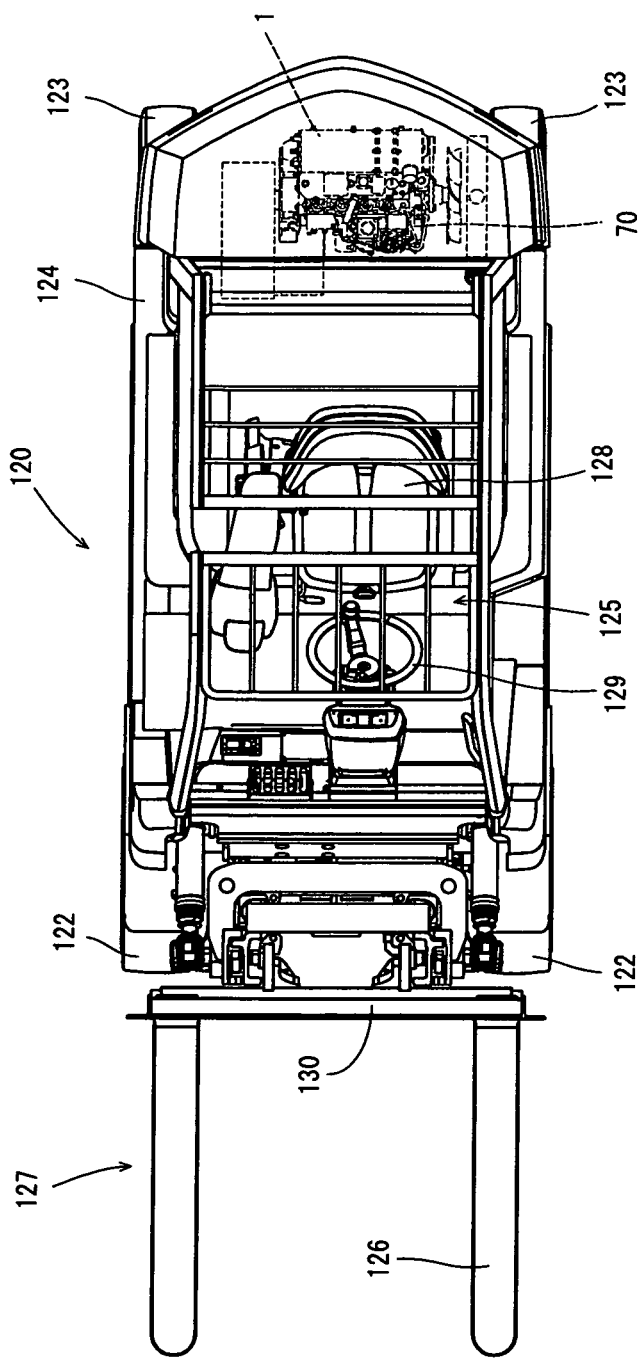
FIG. 22 is a plan view of the fork lift car.

A description will be given of a structure in which the diesel engine 70 is mounted to a fork lift car 120, with reference to FIGS. 21 and 22. As shown in FIGS. 21 and 22, the fork lift car 120 is provided with a traveling machine body 124 having a pair of right and left front wheels 122 and rear wheels 123. A control portion 125 and the diesel engine 70 are mounted to the traveling machine body 124. A front portion of the traveling machine body 124 is provided with a working portion 127 having a fork 126 for a cargo handling work. In the control portion 125, there are arranged a control seat 128 on which the operator seats, a control handle 129, an operation means for operating the output of the diesel engine 70 or the like, and a lever or a switch serving as the operation means for the working portion 127.

The fork 126 is arranged in a mast 130 corresponding to a constructing element of the working portion 127 so as to be movable up and down. The structure is made such that a cargo handling work such as a carriage of a pallet (not shown) loading a cargo thereon is executed by moving up and down the fork 126, mounting the pallet on the fork 126, and moving the traveling machine body 124 forward and backward.

In this case, the structure of each of the portions in the present invention is not limited to the illustrated embodiments, but may be variously changed within the scope of the present invention.

REFERENCE NUMERALS

1 DPF
2 diesel oxidation catalyst (gas purifying filter)
3 soot filter (gas purifying filter)
4 catalyst inner case
5 catalyst outer case
16 exhaust gas inlet pipe
16a downward open end portion
16b upward open end portion
19a-19e support leg body
20 filter inner case
21 filter outer case
34 exhaust gas outlet pipe
60 conduction passage of exhaust gas
70 diesel engine
71 exhaust gas manifold
72 cylinder head

The invention claimed is:

1. An exhaust gas purifying device comprising:
a gas purifying filter for purifying an exhaust gas exhausted from an engine;
an inner case having the gas purifying filter built in; and
an outer case having the inner case built in; and
wherein an exhaust gas inlet pipe having an exhaust gas inlet is provided, an exhaust gas inflow port is provided in one end side in a longitudinal direction of the outer case, the exhaust gas inlet pipe is arranged in a midstream portion in the longitudinal direction of the outer case, and an exhaust gas outlet of the exhaust gas inlet pipe is connected to the exhaust gas inflow port;
wherein the exhaust gas inlet side of the exhaust gas inlet pipe is connected to an exhaust gas manifold of the engine in such a manner that an attaching direction is changeable; and
wherein a conduction passage of the exhaust gas is constructed by an outer surface of the outer case and an inner surface of the exhaust gas inlet pipe.

2. The exhaust gas purifying device according to claim 1, wherein the exhaust gas inlet pipe is attached to the outer case in such a manner as to cover the exhaust gas inflow port and extend in the longitudinal direction of the outer case.

3. The exhaust gas purifying device according to claim 1, wherein the exhaust gas inlet side of the exhaust gas inlet pipe is positioned in a center portion in the longitudinal direction of the outer case, and the outer case is positioned between a cooling fan in one side of the engine and a flywheel housing in the other side.

4. The exhaust gas purifying device according to claim 1, wherein a plurality of filter support bodies are attached to a cylinder head of the engine, and one end side in the longitudinal direction and the other end side in the longitudinal direction in the outer case are detachably connected to the cylinder head via each of the filter support bodies.

* * * * *